(12) United States Patent
Tampieri

(10) Patent No.: US 6,366,283 B1
(45) Date of Patent: Apr. 2, 2002

(54) GENERATING IMAGE DATA

(75) Inventor: Filippo Tampieri, Montreal (CA)

(73) Assignee: Discreet Logic Inc., Quebec (CA)

(*) Notice: Subject to any disclaimer, the term of this patent is extended or adjusted under 35 U.S.C. 154(b) by 0 days.

(21) Appl. No.: 09/261,145

(22) Filed: Mar. 3, 1999

(51) Int. Cl.$^7$ .............................................. G06T 15/50
(52) U.S. Cl. ....................................................... 345/426
(58) Field of Search ................................ 345/419, 420, 345/421, 422, 423, 424, 426, 434, 620, 622

(56) References Cited

U.S. PATENT DOCUMENTS

| | | | |
|---|---|---|---|
| 4,928,250 A | | 5/1990 | Greenberg et al. |
| 5,175,808 A | | 12/1992 | Sayre |
| 5,313,568 A | * | 5/1994 | Wallace et al. ............. 395/126 |
| 5,488,700 A | | 1/1996 | Glassner |
| 5,579,455 A | * | 11/1996 | Greene et al. .............. 395/122 |
| 5,734,385 A | * | 3/1998 | Mima ......................... 345/426 |
| 5,808,620 A | * | 9/1998 | Doi et al. ................... 345/426 |
| 5,894,309 A | | 4/1999 | Freeman et al. |
| 5,909,087 A | | 6/1999 | Bryde et al. |
| 5,914,721 A | * | 6/1999 | Lim ............................ 345/421 |
| 5,936,633 A | * | 8/1999 | Aono et al. ................. 345/432 |
| 6,078,332 A | | 7/2000 | Ohazama |
| 6,084,590 A | | 7/2000 | Robotham et al. |

OTHER PUBLICATIONS

J. Dorsey et al., "Interactive Design of Complex Time–Dependent Lighting," IEEE Comp. Graphics and Applications, 15(2):26–35, 1995.

J. Nimeroff, "Implementation and Analysis of an Image–Based ... Environments," IEEE Trans. on Visalization and Comp. Graphics, 2(4):283–297, 1996.

D. Lischinski et al., "Discontinuity Meshing for Accurate Radiosity," Cornell Univ., IEEE Comp. Graphics and Applications, pp. 25–39, 1992.

D.W. George et al., "Radiosity Redistribution for Dynamic Environments," Cornell Univ., IEEE Comp. Graphics and Applications, pp. 26–34, 1990.

Y. Chrysanthou, "Fast Approximate Quantitative Visibility for Complex Scenes," IEEE Comp. Graphics Int'l Proceedings, pp. 220–227, 1998.

E. Pang et al., "An Efficient Implementation of Affine Transformation Using One–Dimensional FFT's," University of Toronto, Ontario, Canada MTS 3G4, IEEE Conf., 4:2885–2888, 1997.

* cited by examiner

Primary Examiner—Mark Zimmerman
Assistant Examiner—Enrique L Santiago
(74) Attorney, Agent, or Firm—Gates & Cooper LLP

(57) ABSTRACT

Image data is generated for a scene, in which the scene includes object surfaces in three-dimensions. Intersecting or touching surfaces are identified by analyzing the surfaces within a hierarchy of bounding volumes. Thereafter, a multi-resolution representation of a radiosity equation is constructed for the scene, wherein one of the identified surfaces is considered separately for light emission on either side of a previously identified line of contact or intersection.

34 Claims, 20 Drawing Sheets

Figure 5B  $\quad B_i A_i = E_i A_i + R_i \sum_{j=1}^{n} B_j A_j \cdot F_{ji}$

Figure 5C  $\quad F_{ij} \cdot A_i = F_{ji} \cdot A_j$

Figure 5D  $\quad B_i = E_i + R_i \sum_{j=1}^{n} B_j F_{ij}$

GENERATING IMAGE DATA

FIELD OF THE INVENTION

The present invention relates to generating image data, wherein a plurality of surfaces are defined in three dimensional space.

BACKGROUND OF THE INVENTION

Several procedures are known for rendering images containing elements defined as three-dimensional data. A known approach to generating images of photo-realistic quality is to consider reflections between all elements simultaneously. The light emission of any given element is considered as being dependent upon the sum of contributions from all other elements and a set of equations is defined that represents these interactions. The light emission values for all the elements are then determined simultaneously by solving a system of equations.

This procedure is known as radiosity simulation. Surfaces of objects are sub-divided into mesh elements of varying sizes in order to determine an appropriate level of resolution required to represent the change in brightness that will be encountered across the surface of the object. The total number of mesh elements required for a scene is typically very large, and the resulting system of equations is also extremely large. Several refinements to radiosity simulation have been established in order to make implementation of this method practical for scenes containing large numbers of objects.

A known advantage of radiosity simulation is that once the system of equations has been solved, and light emission values determined, the light emission of mesh elements may be considered as view independent, resulting in a separate radiosity rendering process that is capable of rendering a view from any position. The high efficiency of radiosity rendering makes radiosity particularly suitable for demanding applications, such as generating long sequences of image data frames for film or video, or generating image data in real-time.

In the process of radiosity simulation, the presence of intersecting surfaces may result in problems being encountered when surfaces are sub-divided into mesh elements, and element boundaries do not coincide with surface intersections. This results in inappropriate brightness values being encountered at such intersections. A known method for avoiding this problem is to identify intersecting surfaces prior to subdivision into mesh elements, and to create mesh element boundaries along such intersections.

Radiosity simulation is increasingly used for the generation of photo-realistic scenes, comprising many tens of thousands of polygons, of which object surfaces are comprised. Identification of intersecting polygons as a prior step to constructing a radiosity simulation equation is therefore restricted by the number of combinations of intersecting polygons that must be checked. For example, if fifty thousand polygons are present in a scene, the number of potential intersections that must be checked, according to known methods, would be five times ten raised to the power of eight ($5 \times 10^8$). Checking each individual pair of polygons for intersection is a non-trivial mathematical operation. In practice, therefore, the identification of intersecting surfaces in photo-realistic scenes is impossible to achieve directly, using known methods, and operator intervention is necessary in order to identify surfaces where such problems occur.

SUMMARY OF THE INVENTION

According to a first aspect of the present invention, there is provided a method of generating image data for a scene, wherein said scene includes object surfaces in three-dimensions, comprising the steps of identifying intersecting or touching surfaces by analysing said surface within a hierarchy of bounding volumes; and constructing a multi-resolution representation of the radiosity equation for said scene, wherein one of said identified surface is considered separately for the light emission on either side of a line of contact or intersection.

In a preferred embodiment, the step of identifying intersecting or touching surfaces by analysis of bounding volumes, includes the component steps: considering bounding volumes and surfaces as items; identifying pairs of items; determining whether both items in the pair are surfaces; determining an overlap of items or an intersection of surfaces; and upon a condition of overlap, recursing the above component steps, retaining the smaller item and selecting another; or upon condition of an intersection, storing an indication of this condition; or upon condition of an intersection, storing an indication of this condition.

Preferably, the hierarchy of bounding volumes is created for the dual purpose of identifying intersecting or touching surfaces, and an additional method for generating image data from said scene.

According to a second aspect of the present invention, there is provided apparatus for generating image data from scene data, including processing means, and storage means for storing said scene data and for storing instructions for said processing means, wherein said scene includes object surface in three-dimensions and said instructions are arranged to control said processing means to perform the steps of: identifying intersection or touching surfaces by analysing said surfaces within a hierarchy of bounding volumes; and constructing a multi-resolution representation of the radiosity equation for said scene, wherein one of said identified surfaces is considered separately for light emission on either side of a line of contact with intersection.

In a preferred embodiment, the apparatus is further configurable to perform the step of solving the radiosity equation. Preferably, the apparatus is further configurable to perform a step-by-step rendering of said image data in response to a user specified view. Preferably, the apparatus is further configurable to include the step of rendering the image data in response to camera data generated within a virtual set.

BRIEF DESCRIPTION OF THE DRAWINGS

FIG. 5B summarises light energy transfer between a single receiving surface, and an arbitrary number of emitting surfaces;

FIG. 5C shows the radiosity reciprocity equation;

FIG. 5D shows the classical radiosity equation;

DETAILED DESCRIPTION OF THE PREFERRED EMBODIMENTS

Figure 1:
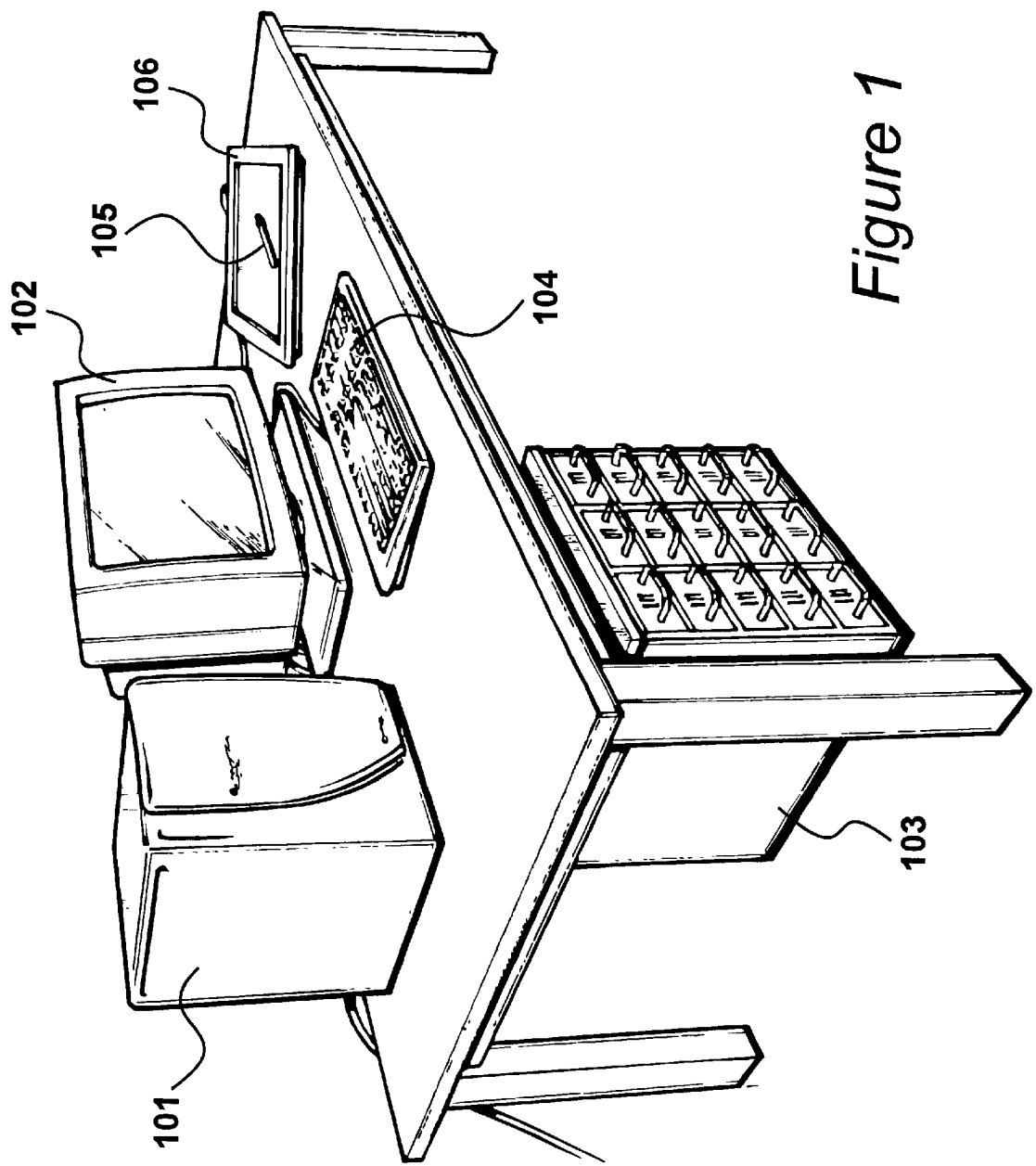
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Thereafter, this information is made available for particular viewing positions during radiosity rendering. The rendering process requires a sufficiently low level of computation to enable image frames of high definition and high photo realism to be rendered with high efficiency.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
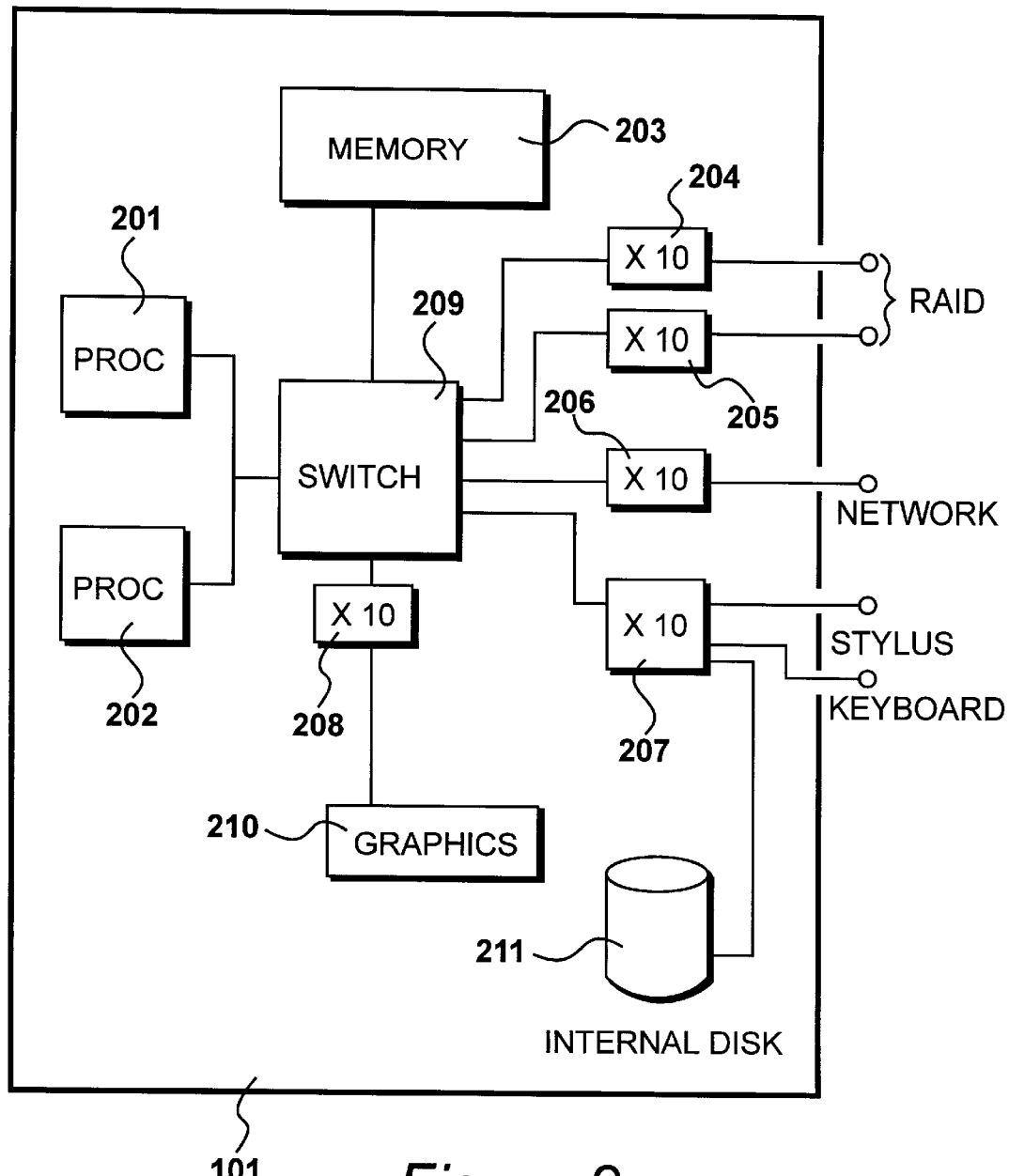
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 and with a memory 203 and other peripherals. The memory 203 includes typically two hundred and fifty-six megabytes of dynamic RAM. The memory is used to store instructions for the processors, and data, including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronisation between the peripheral circuits and the extremely high speed data paths of the main processor structure.

A first XIO interface circuit 204 provides bi-directional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 211, four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
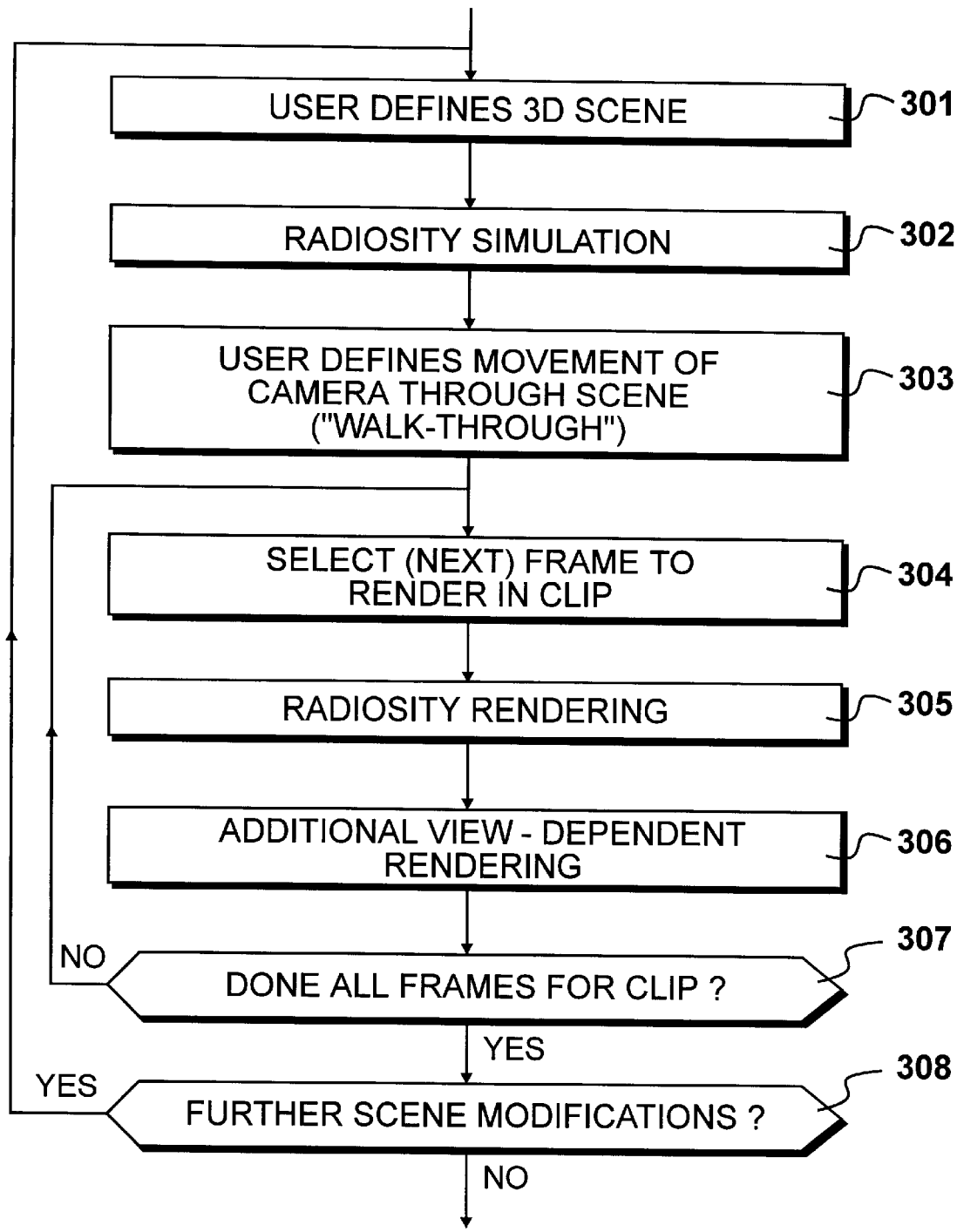
FIG. 3 details processes performed by the processing system shown in FIG. 1 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyse objects within the scene so as to optimise their deconstruction into mesh elements, and then to calculate a light emission value for each mesh element.

At step 303 the user defines movement of a virtual camera through the scene, defining a changing view that is known as a "walk through". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light emission of each element is projected with respect to the camera position into a two dimensional image plane. At step 306 additional view-dependent rendering is added. Radiosity generates light emission values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with light emission values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

Figure 4:
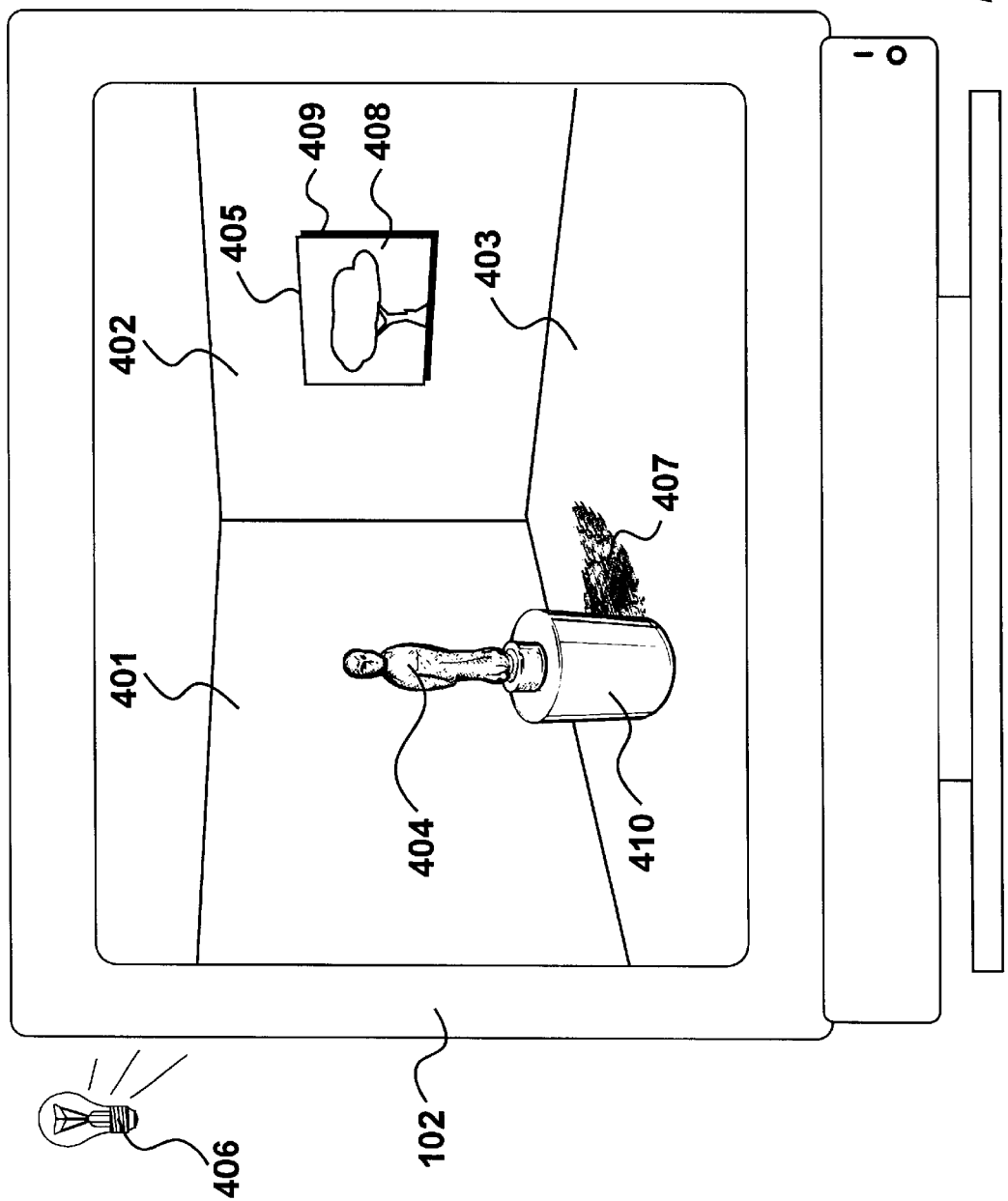
FIG. 4 details an image displayed on the monitor shown in FIG. 1, including several scene objects, that include two walls and a picture.

An example of a scene for rendering using a radiosity procedure is illustrated in FIG. 4. The scene consists of a room including a first wall 401, a second wall 402, and a floor 403. A statue 404 equipped with a base 410 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 406, a frame 408 of picture 405 also casts a slight shadow 409 against the wall 402.

The presence of a light source in the scene results in a quantity of light energy being introduced. This light energy is scattered throughout the scene in a complex way, that is dependent upon the reflectivities, shapes and positioning of objects within the scene. Radiosity simulation constructs a system of equations to represent these relationships, and is thereby able to determine light emission values that are very realistic.

Figure 5A:
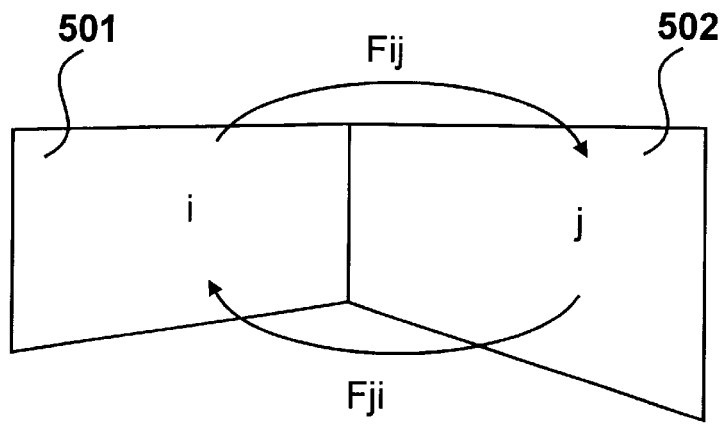
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 501 will be transferred to element 502, and vice versa. The actual proportion of light energy transferred from one element to another is called the form factor. If element 501 is considered to be a source element i, and element 502 is considered to be a receiving element j, then the form factor for the transfer of light energy per unit area from i to j is denoted Fij. Similarly, the proportion of energy from element j transferred to element i is denoted Fji.

It can be seen from this example that calculating the form factor requires a determination of the visibility of the source element with respect to the receiving element. This is made more complex if a third occluding element is possibly present, which may totally or partially block light transfer between the elements for which the form factor is being calculated. In the event that a scene comprises only two elements 501 and 502, and one of these is a light source, it is possible to construct a pair of simultaneous equations that may be solved in order to obtain the light emission from each element without difficulty. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B. The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product $B_iA_i$ which is then considered as equal to the self emission of the element $E_i$ multiplied again by its area $A_i$ plus the sum of all light received from all of the co-operating elements. Thus, for every single co-operating element in the scene, each instance of which is denoted by the letter j, the amount of light received by element i is equal to the flux density $B_j$ of element j multiplied by the area $A_j$ of element j multiplied by the form factor $F_{ji}$ expressing the proportion of light transferred from j to i. The sum of these values is then multiplied by the reflectance $R_i$ representing the reflectance of element i.

As previously stated, the procedure is underpinned by notions of conservation of energy. Therefore, in accordance with this principle, the form factor $F_{ij}$ for the transfer of light energy from i to j, multiplied by the area $A_i$ of element i is equal to the form factor $F_{ji}$ representing the transfer of light energy from j to i multiplied by the area $A_j$ of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density $B_i$ of element i is given by the source flux density $E_i$ of element i plus the reflectance $R_i$ multiplied by the sum for each element j, of flux density $B_j$ multiplied by the form factor $F_{ij}$.

The equation shown in FIG. 5D is the one used to determine light emission values for elements in a scene. In a scene containing fifty thousand elements, the right side of this equation would have to be evaluated fifty thousand times in order to obtain an initial illumination value for a single element i. Thus, in order to calculate an initial illumination value for all fifty thousand elements, the right side of this equation must be evaluated fifty thousand times, fifty thousand times. Furthermore, this large number is also the number of form factors that need to be calculated before the system of equations can be solved. Thus a radiosity simulation utilising this approach is impractical for realistic image synthesis of scenes containing large numbers of elements.

Figure 6:
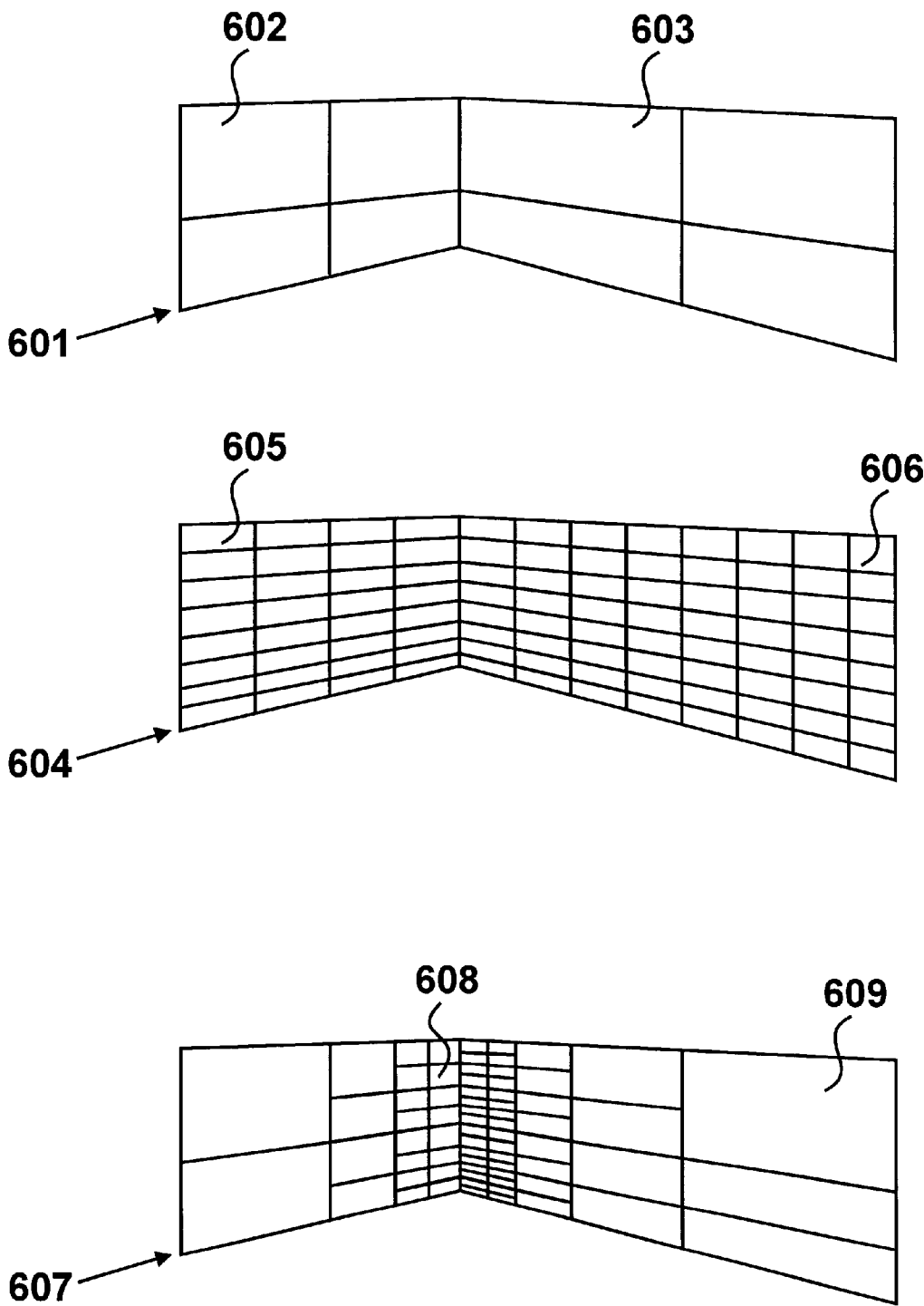
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artefacts. This problem may be understood by considering that, although illumination throughout the scene is non-linear, the illumination gradient where the walls meet changes faster than in the middle of a wall. Thus, by rendering the scene at the level of resolution shown at 601, the shading close to the intersection of the walls will be unrealistic.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The subdivisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photo-realistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 410, are considered as forming a single cluster element. Interactions with distant elements, such as those comprising a wall 402, may then be expressed by the use of a single form factor, because the light reaching the wall from the statue is weak. The difference between the statue as it is, and the statue represented, for example, as a single radiating cylinder, will be below the required accuracy threshold when calculating the form factor for transfer from the statue to the wall. Closer surfaces, such as wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

Figure 8:
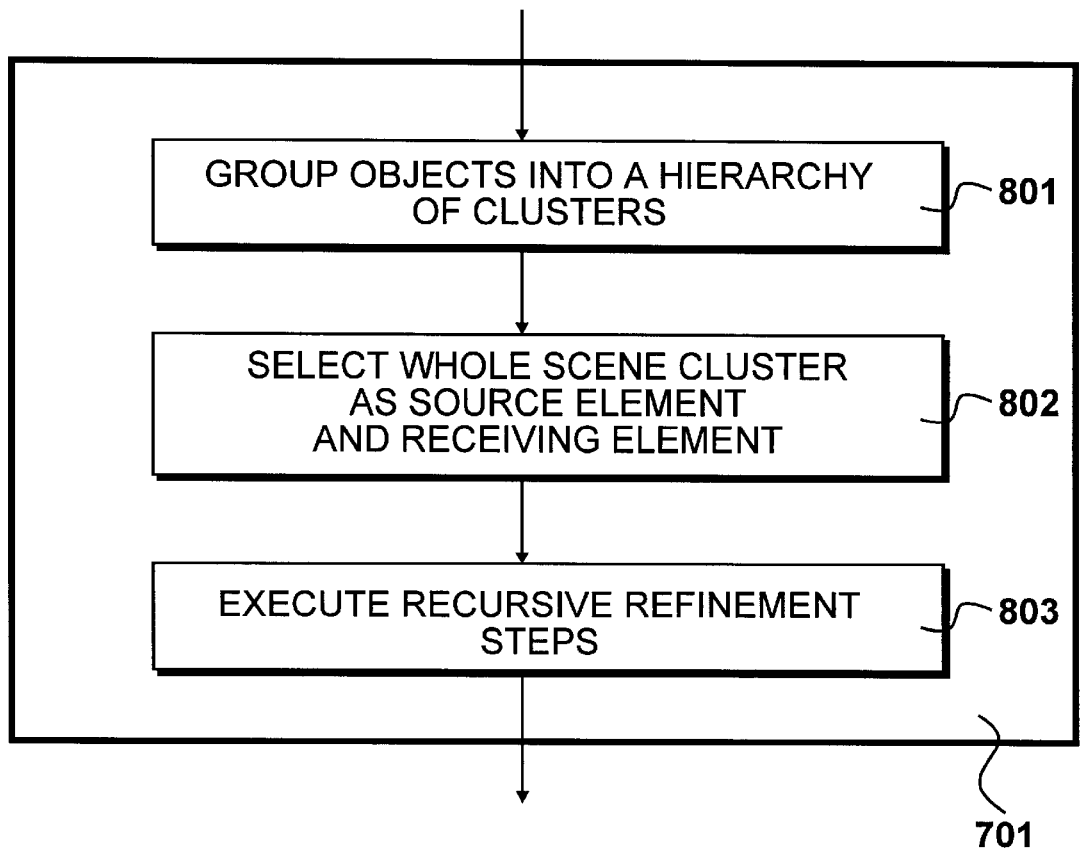
FIG. 8 details a prior art process for constructing the multi-resolution representation of the radiosity equation shown in FIG. 7, including a process of executing refinement steps.

Procedure 302 for performing radiosity simulation is detailed in FIG. 8. At step 801 all of the scene is analysed such that a hierarchy of cluster elements is generated. At the top of this hierarchy is a cluster that represents the whole scene. Below this cluster are clusters that represent distinct groups of objects, related by their physical proximity. A method for hierarchical clustering of objects is described in "A Clustering Algorithm for Radiosity in Complex Environments", by Brian Smits, James Arvo and Donald Greenberg, Proceedings of SIGGRAPH '94, pp.435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This apparently unlikely starting point is never in actual fact considered as a genuine light path. However, it serves to initiate the recursive refinement process of step 803. At step 803, the whole scene is considered initially as emitting light to itself. The recursive refinement process considers this as resulting in an excessively bad quality of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
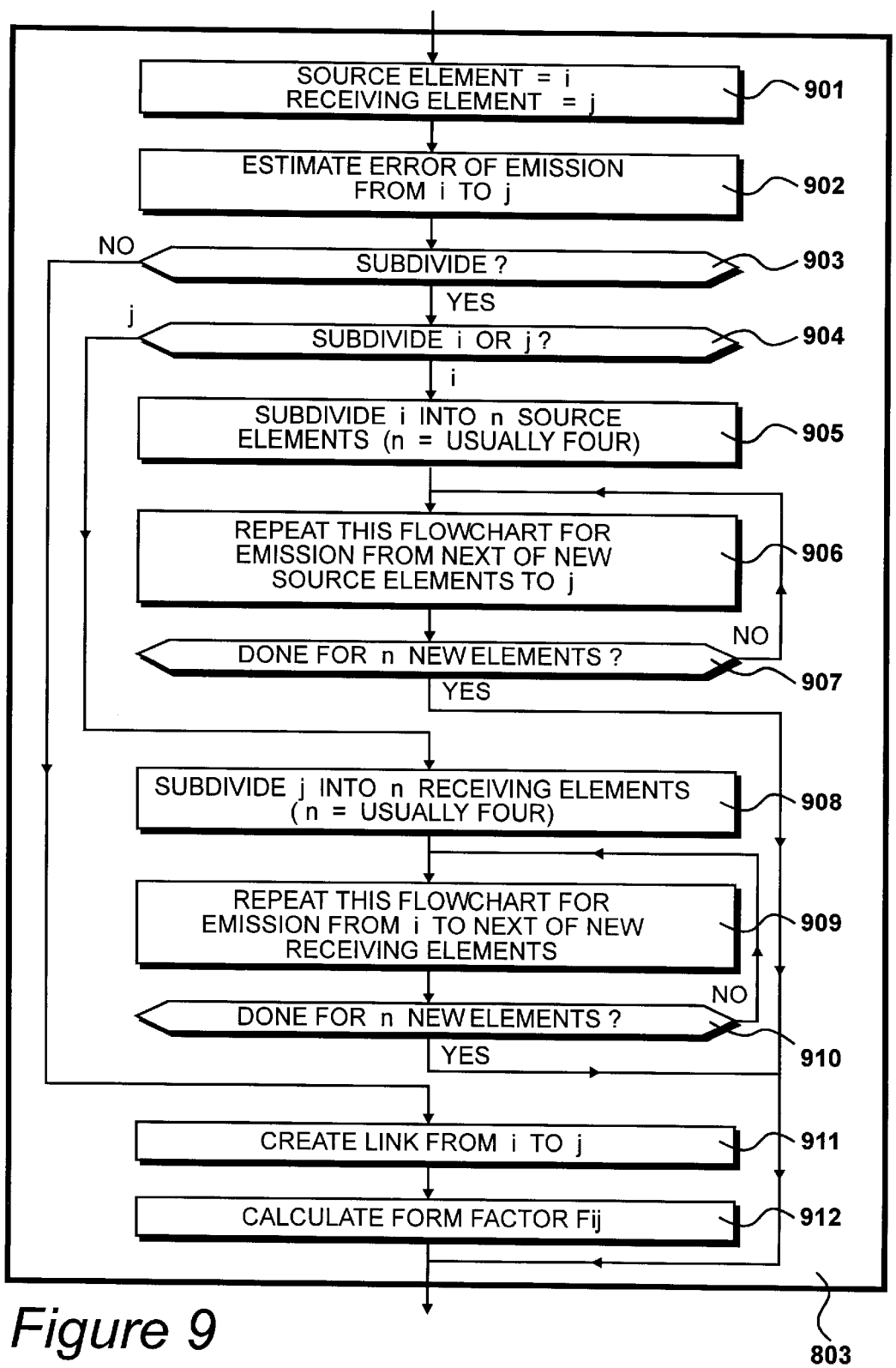
FIG. 9 details the process of executing refinement steps shown in FIG. 8.

A recursive refinement process 803 shown in FIG. 8 is detailed in FIG. 9. A source element and a receiving element will have been selected by either process 802, or subsequent steps 906 or 909 within the same flowchart. These are now initially denoted as source element i and receiving element j at step 901. At step 902 an error is determined for the transfer of light from i to j, wherein i and j are uniformly emissive. Upon initial execution of the flowchart of FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in the identification of component cluster elements, and/or component object elements. If, however, the element that is being subdivided is an object, the subdivision process at step 905 may create new elements. Typically, when a mesh is being created, this will result in the element being split up into four new elements. At subsequent levels of recursions, these mesh elements may themselves be further split, into usually four new elements, and so on, until the desired level of resolution is achieved in order to attain the required level of quality.

If an assessment is made at step 904 to the effect that the receiving element j is to be subdivided, control is directed to step 908 and a subdivision of j into receiving elements, in a similar manner, is performed at step 908.

At step 906, the processes of the flowchart shown in FIG. 9, and of which step 906 is a part, are repeated, by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive step at step 906, control is directed to step 907, where a question is asked as to whether any additional newly identified elements remain to be considered as emitters. If answered in the affirmative, control is directed back to step 906, where the next newly identified element is considered. Alternatively, all new elements have been considered. This represents the exit condition for the whole of the flowchart of FIG. 9.

Similar processes are performed at steps 908, 909 and 910, where newly identified elements are considered as receiving elements. In the recursive step 909 each newly identified receiving element is considered as receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels, for example between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
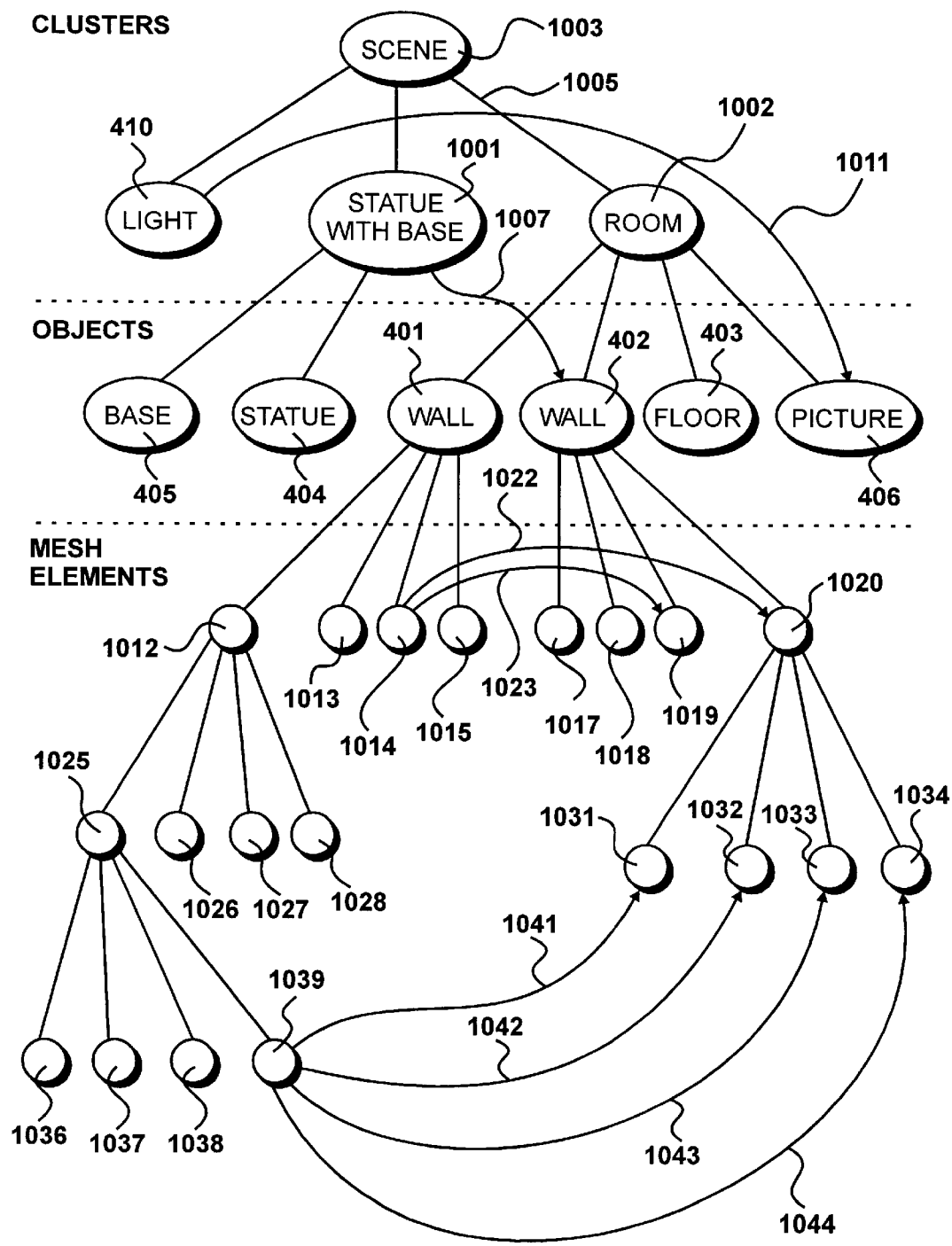
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 410, the statue 404, the first wall 401, the second wall 402, the floor 403 and the picture 406. Within the data structure, these objects are clustered so that the base 410 and the statue 404 may be considered as a statue with base cluster 1001. Similarly, the first wall 401, the second wall 402, the floor 403 and the picture 405 are considered as a room cluster 1002. The statue with base cluster 1001 and the room cluster 1002 are then unified into a scene cluster 1003, which also includes the light source 406.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting to elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
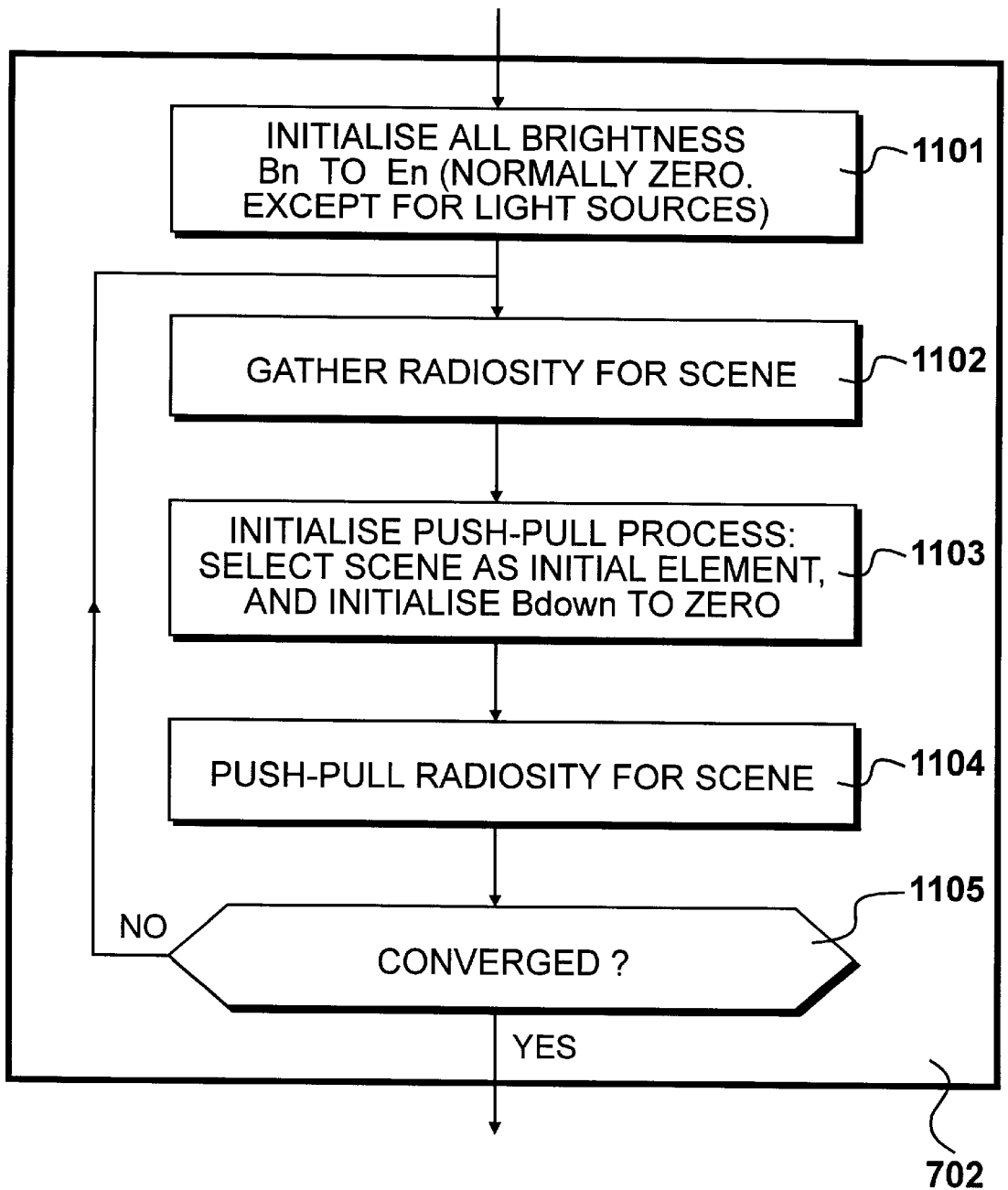
FIG. 11 details the process of solving the radiosity equation shown in FIG. 7, including a process of gathering the radiosity for the scene, and a process of push-pull radiosity for scene.

Procedure 702 for the solving of the radiosity equation is detailed in FIG. 11. Each element and object in the scene has an illumination value, and it is the purpose of the radiosity equation to determine an illumination value Bi for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements Bn are initialised to be equal to their self emission values En which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its sub-elements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, the question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps will be required in order to reach a suitably stable set of illumination values.

Figure 12:
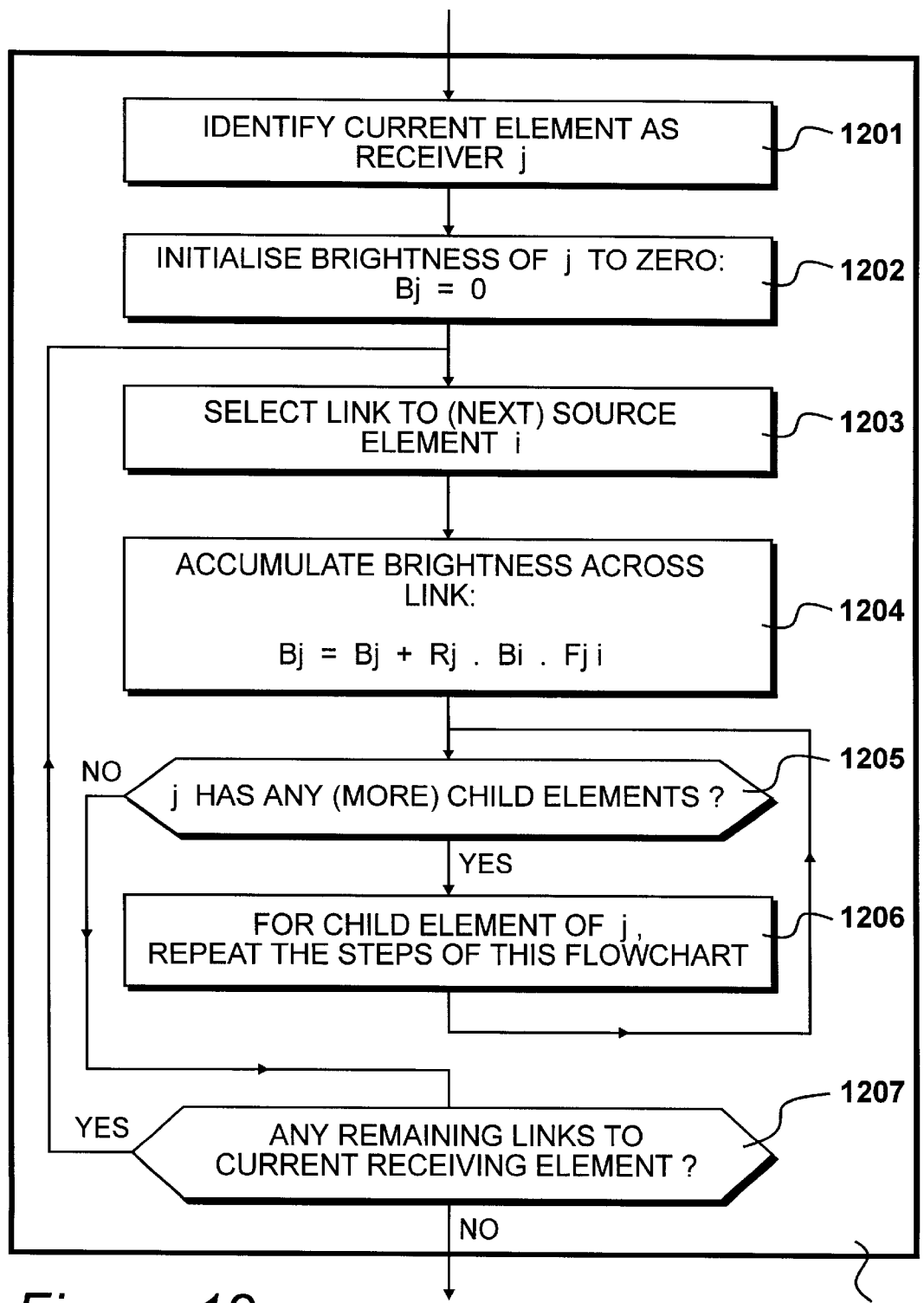
FIG. 12 details the solution for the process of gathering the radiosity for the scene shown in FIG. 11.

A known method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 the question is asked to whether element j has any more child or sub-elements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
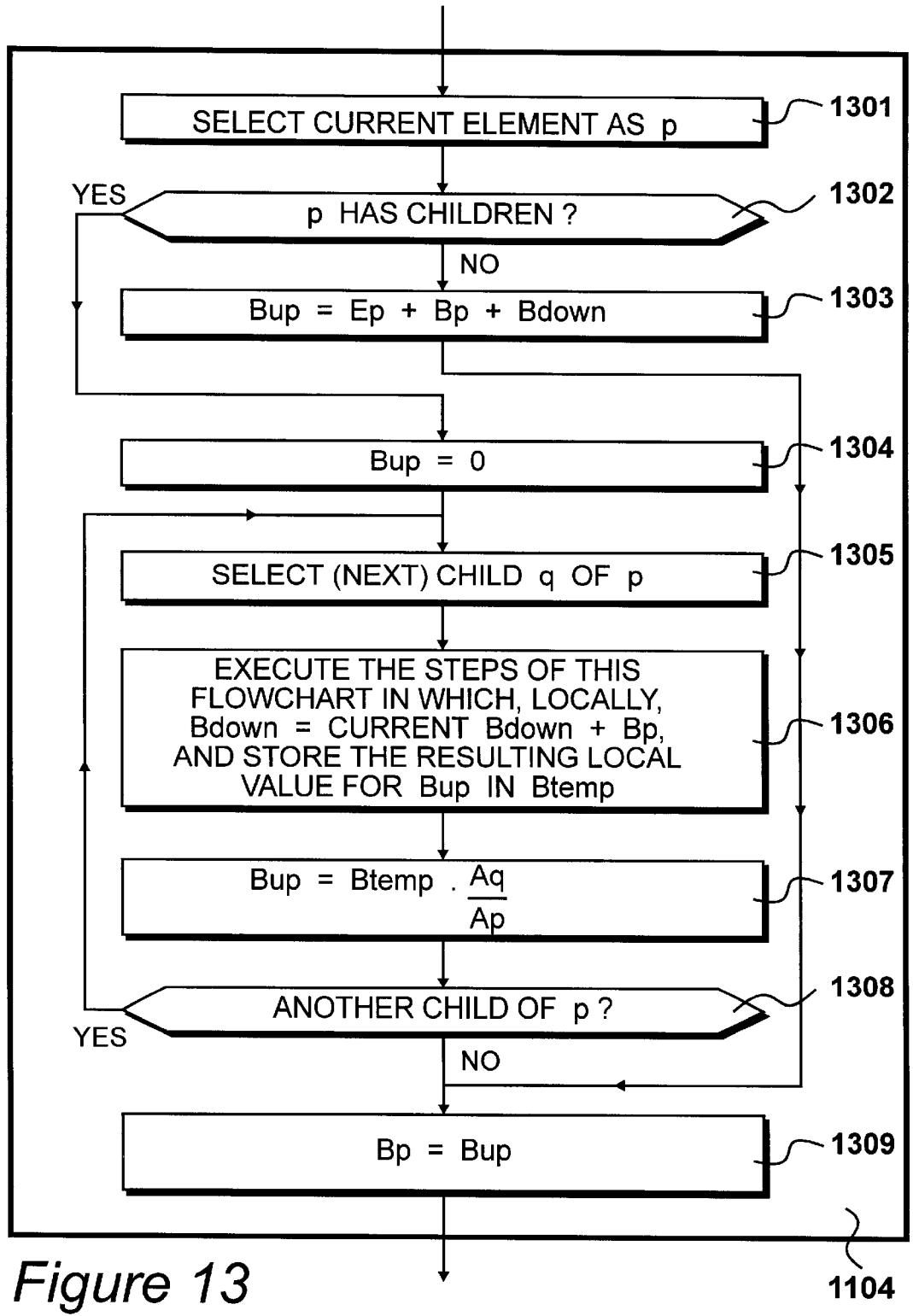
FIG. 13 details the process of push-pull radiosity for the scene shown in FIG. 11.

A known procedure for step 1103, the push-pull process for the illumination in the scene, shown in FIG. 11 is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result, in terms of a local value for Bup is stored in variable Btemp. Thereafter, control is directed to step 1307.

At step 1307 variable Bup is set equal to value Btemp, the local value determined by the recursive call to procedure 1306 which is then multiplied by the area of the child divided by the area of the parent to compute an area average.

At step 1308 a question is asked as to whether another child of p is present and, when answered in the affirmative, control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

Figure 7:
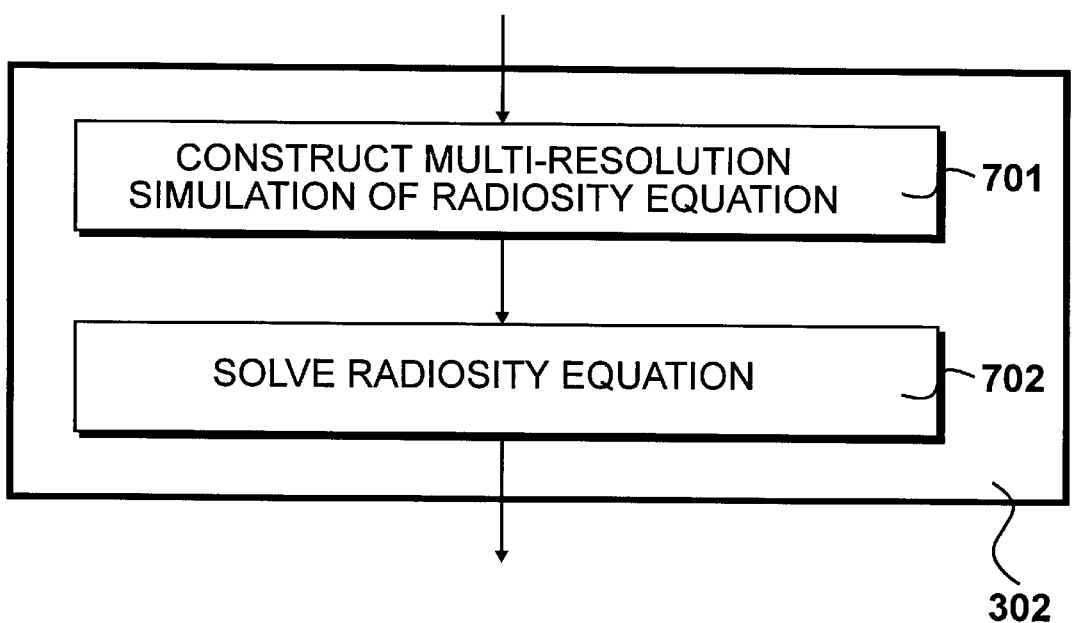
FIG. 7 details the process of radiosity simulation, shown in FIG. 3, including processes of constructing a multi-resolution representation of the radiosity equation, and solving the radiosity equation.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps__1, and then at step 702, the radiosity equation is solved to yield a first solution. On the next iteration, the error tolerance is reduced, to eps__2. However, the multi-resolution representation constructed at step 701 in the previous iteration is already valid down to the eps__1 level of error tolerance. Thus, to continue to the reduced level of error tolerance, given as eps_2, the pre-existing multi-resolution representation can be continued by further addition of mesh elements and establishing links and there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factor. This information can be used to improve the accuracy by which errors are predicted, such that even pairs of surfaces with large form factors do not need to be respectively meshed, if the actual light that would be transferred across those links is insignificant. This form of iterative refinement is known as BF refinement.

The hierarchical sub-division as illustrated at 607, is directed towards dividing regions into very small elements, where maximum benefit is derived from this division, while in other areas retaining relatively large elements so as to reduce computation demands. Problems with this approach arise if surfaces intersect along boundaries that are not aligned with mesh element boundaries. This situation is illustrated in FIG. 14.

Figure 14:
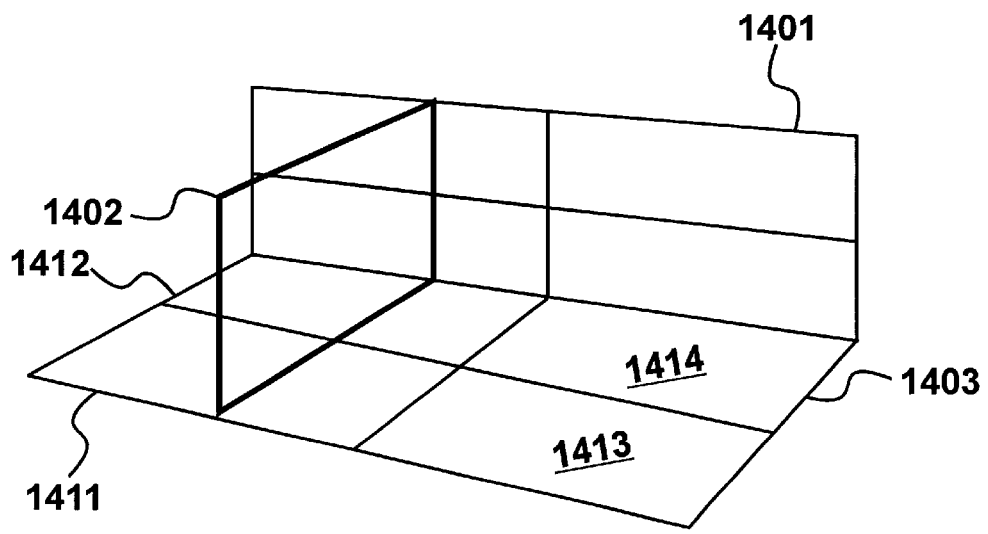
FIG. 14 shows an example of a virtual scene that has been hierarchically meshed without taking into account the intersection of surfaces.

In FIG. 14 there are three walls. A vertical wall, 1401 forms a right angle with a floor surface 1403, and a dividing wall surface 1402. Each of the surfaces 1401, 1402 and 1403 has been sub-divided into mesh elements. However, the full level of meshing required has not been shown, in order to preserve clarity for the purposes of the present description. The floor 1403 has been sub-divided into a plurality of mesh elements 1411 to 1414. The base of the dividing wall 1402 intersects the floor 1403 along a boundary that is not aligned with the borders of mesh elements 1411 or 1412. If the multi-resolution simulation of the radiosity equation is constructed with mesh elements that are crossed by other surfaces (either touching or intersecting these elements), such as dividing wall 1402, a problem occurs with light leaks.

Mesh elements 1413 and 1414 receive light from the environment bounded by the dividing wall 1402, the floor 1403 and the rear wall 1401, to the right of the dividing wall 1402. However, as each mesh element is considered as having a uniform brightness, the lighting of the portion of the mesh element 1411 that is to the left of the dividing wall 1402 will be inappropriate to the volume in which it is located. A similar problem occurs with the left portion of the mesh element 1412. Furthermore, light interactions occurring to the left of the dividing wall 1402 will contribute to the brightness of mesh elements 1411 and 1412 in a way that is inappropriate to the brightness of these elements within the environment to the right of the dividing wall 1402. These problems may be generally considered as light leaks.

The same problems occur at the intersection of the rear wall 1401 with dividing wall 1402. These problems occur wherever surfaces touch or intersect, unless their line of contact coincides with mesh element boundaries. Such coincidence is likely to occur where, for example, the edges of walls meet, such as at the intersection of the floor 1403 with the rear wall 1401. However, in many instances within a typical scene, intersections are not clearly defined as occurring at boundaries that will coincide with mesh element boundaries, and light leaks will occur.

A solution has been proposed for the problem illustrated in FIG. 14. This is described in "Making Radiosity Usable" by Daniel R. Baum, Stephen Mann, Kevin P. Smith, James M. Winget, in ACM SIGGRAPH Computer Graphics, Vol. 25, No. 4(July 1991), Pages 51–60. This reference discloses that it is possible to resolve the problems of light leaks by sub-dividing surfaces into mesh elements along surface intersections.

Figure 15:
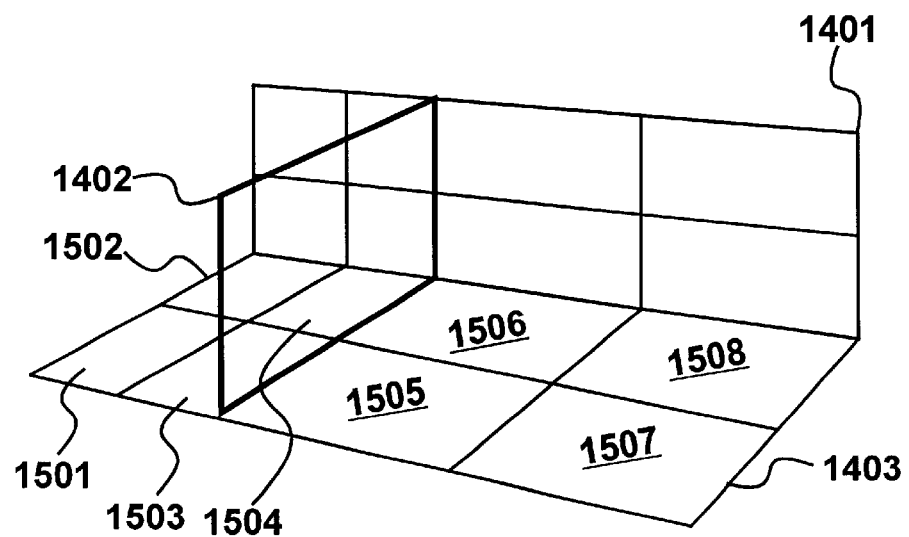
FIG. 15 shows the same scene as FIG. 14, but where hierarchical meshing has taken into account the intersection of surfaces, in accordance with the present invention.

FIG. 15 details the result of performing mesh sub-division of the surfaces shown in FIG. 14, in accordance with identified surface intersections. The floor 1403 has been divided into two separately meshed areas, comprising a first area to the left of the dividing wall 1402, comprising mesh elements 1501 to 1504, and a second area of the floor 1403, to the right of the dividing wall 1402 that is sub-divided into differently sized mesh elements 1505 to 1508. The rear wall 1401 is similarly meshed in accordance with the intersection of the dividing wall 1402. This arrangement results in zero light leaks of the type that were a problem with the arrangement shown in FIG. 14.

Although it is known to implement a solution of the type shown in FIG. 15, known techniques for subdividing the mesh elements during the radiosity simulation so that their boundaries match lines of contact or intersection between pairs of surfaces in the original scene, are very inefficient.

Figure 16:
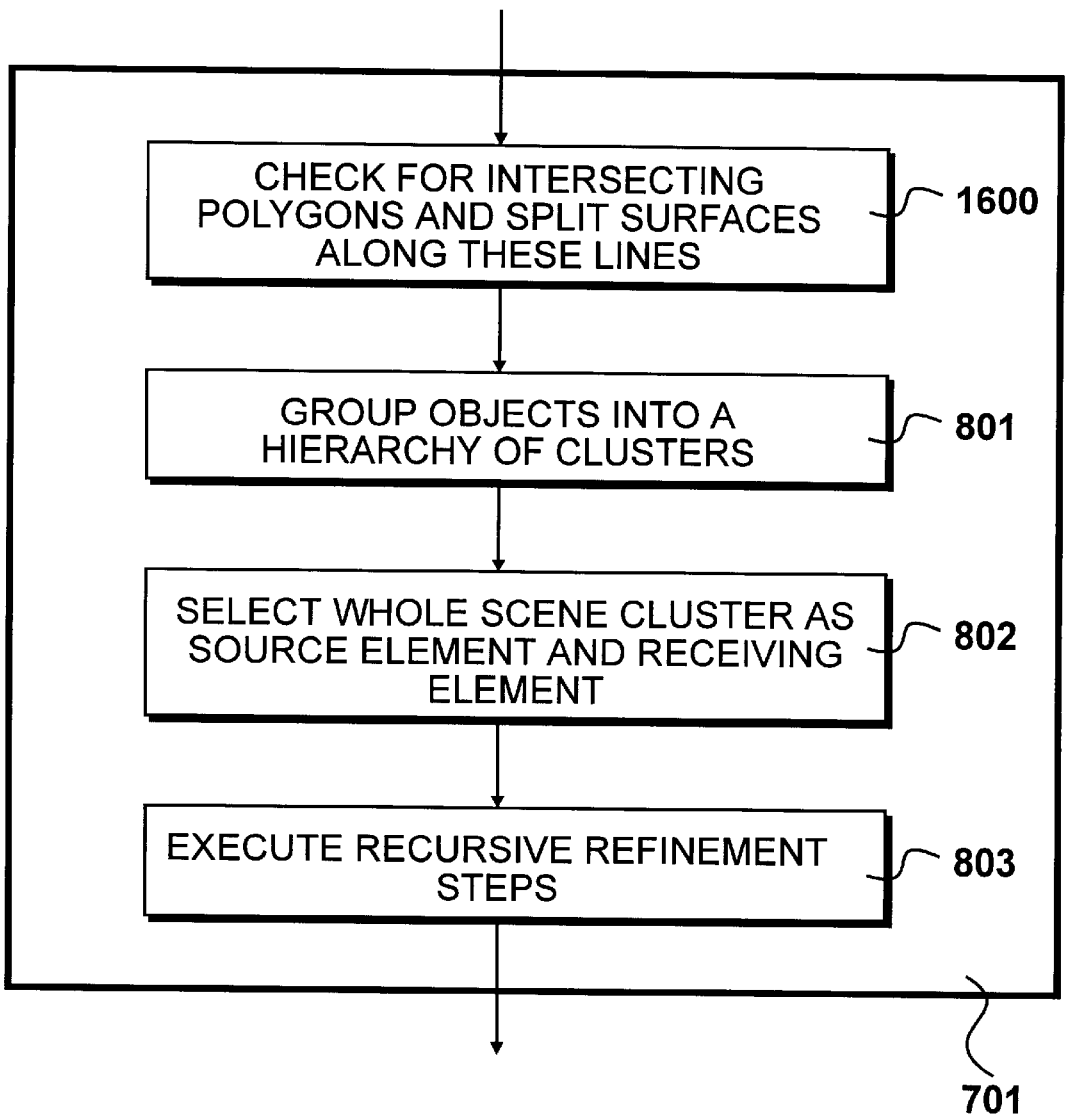
FIG. 16 details an improved method for constructing the multi-resolution simulation of the radiosity equation shown in FIG. 7, including a step of checking for intersecting polygons.

An improved method for step 701, of constructing a multi-resolution simulation of the radiosity equation, is shown in FIG. 16. At step 1600 a check is made for intersecting polygons. Within this step, intersecting polygons are identified, and the original surfaces are then split along lines of intersection wherever these occur. The resulting surfaces are used as a modified scene description for the radiosity simulation. Subsequently steps 801, 802 and 803, shown in FIG. 16 operate substantially as described with reference to FIG. 8.

Figure 17:
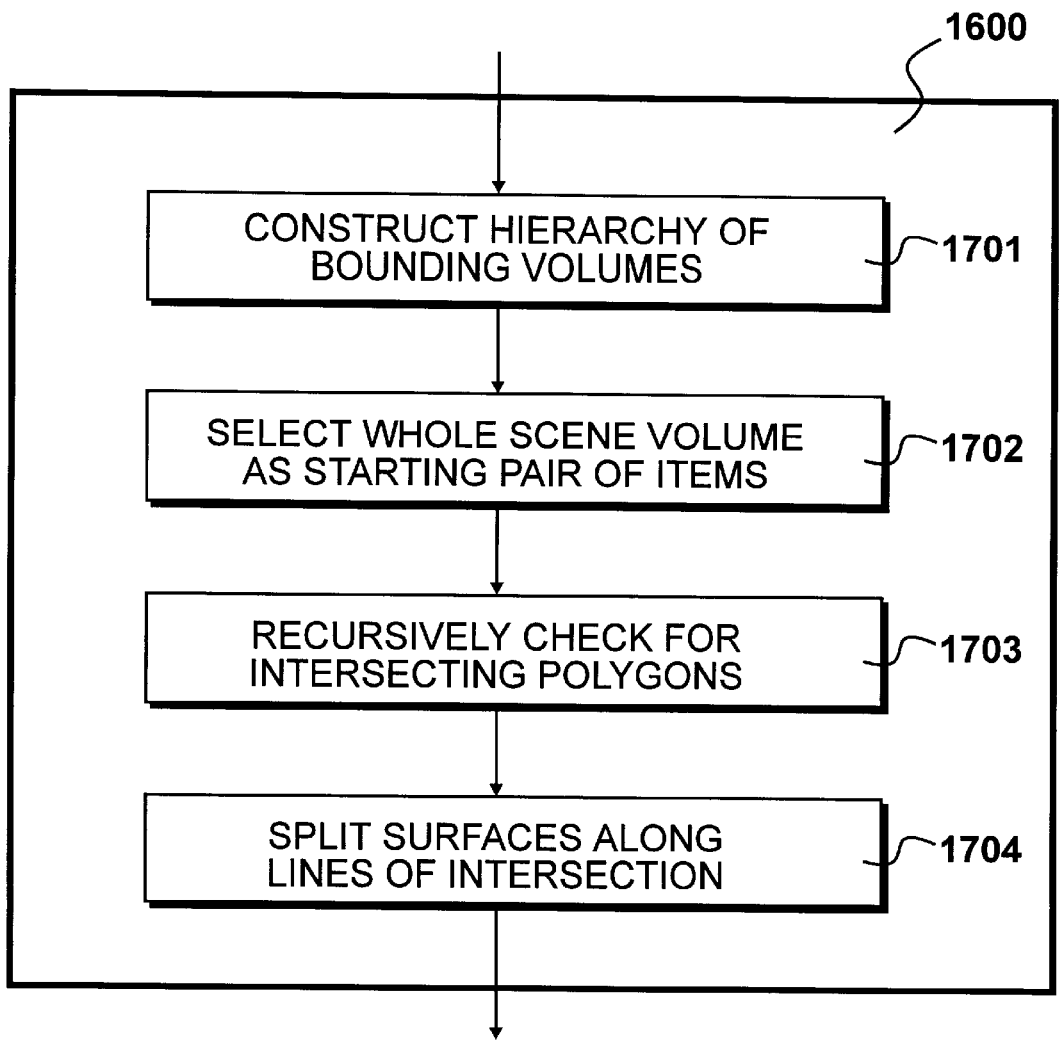
FIG. 17 details the step of checking intersecting polygons shown in FIG. 16, including constructing a hierarchy of bounding volumes and recursively checking for intersecting polygons.

The check for intersecting surfaces (or polygons), performed at step 1600 in FIG. 16 is detailed in FIG. 17. At step 1701 a hierarchy of bounding volumes is constructed. It is possible, in an alternative embodiment, that a hierarchy of bounding volumes already exists for the purpose of clustering for a faster radiosity simulation or for use as an acceleration scheme in visibility computations that are also used during the radiosity computations. At step 1702 the whole scene volume is selected as a starting pair of items. Thus, a pair of items is identified, each of which is the whole scene volume. At step 1703 a check is made for intersecting polygons using a search within the hierarchy of bounding volumes identified at step 1701. At step 1704 surfaces of intersecting polygons identified at step 1703 are split along their lines of intersection, so that the resulting surfaces are then used as part of a modified scene description that is used for constructing the radiosity simulation.

Figure 18:
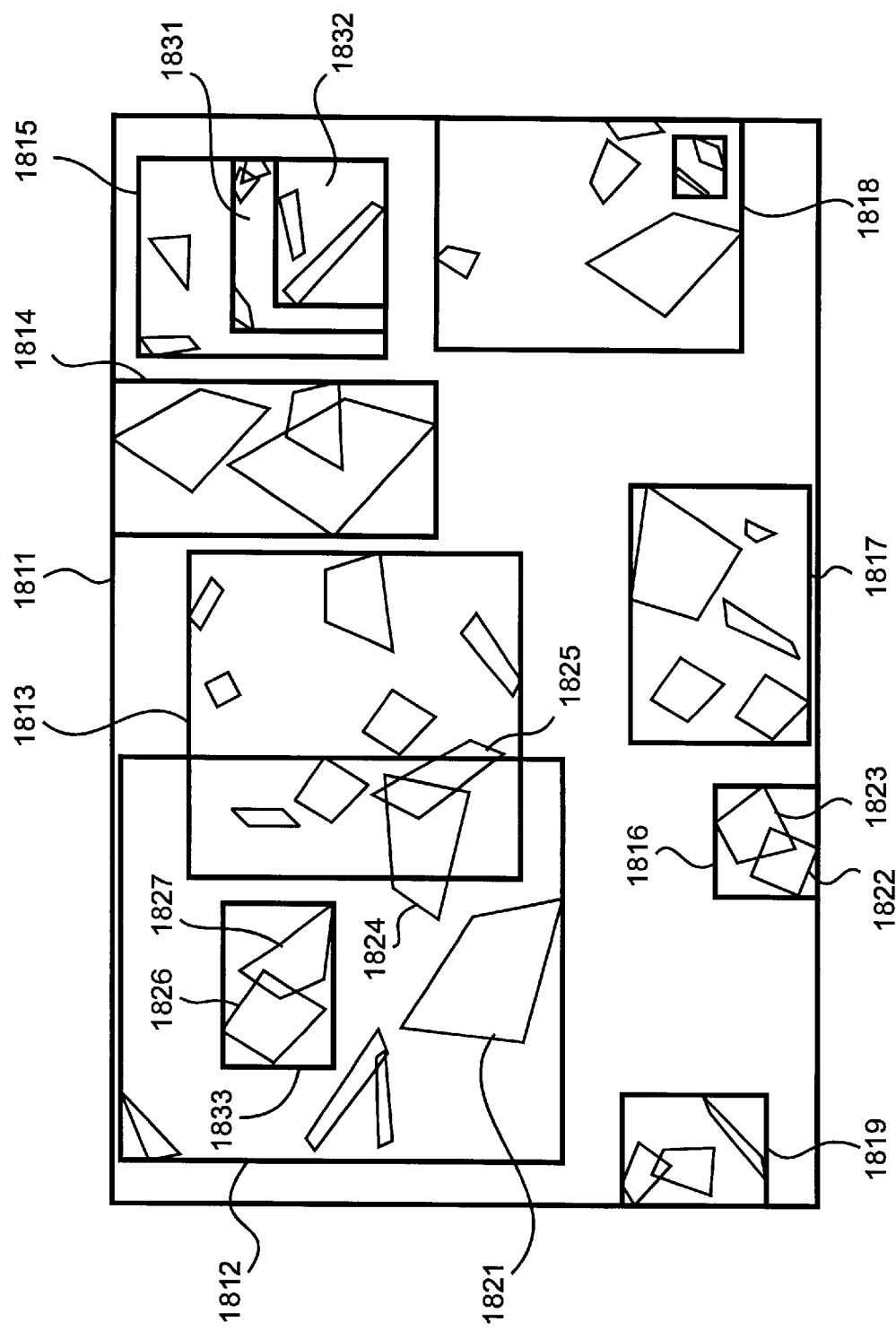
FIG. 18 shows an example of a hierarchy of bounding volumes generated in accordance with a process of constructing a hierarchy of bounding volumes shown in FIG. 17.

The hierarchy of bounding volumes generated at step 1701 is illustrated by way of a two-dimensional example shown in FIG. 18. Algorithms for constructing a hierarchy of bounding volumes are known. One such algorithm is described by Jeffrey Goldsmith and John Salmon in "Automatic Creation of Object Hierarchies for Ray Tracing", IEEE Computer Graphics & Applications, May 1987, pages 14–20. In constructing the hierarchy of bounding volumes, surfaces are grouped into bounding volumes according to proximity and smaller bounding volumes are grouped into larger bounding volumes to form the hierarchy. The resulting bounding volumes may overlap.

Having created the hierarchy of bounding volumes, it becomes possible to identify very quickly, which bounding volumes do not touch or overlap, and therefore exclude polygons contained within separate bounding volumes from the possibility of intersection. In the example shown in FIG. 18, all scene polygons are bounded by a largest bounding volume 1811. This volume contains a hierarchy of smaller bounding volumes 1811 to 1819, some of which may overlap each other, as is the case with bounding volumes 1812 and 1813. Any bounding volume may contain polygons, such as polygon 1821, or other bounding volumes, such as bounding volumes 1831 and 1832. Pairs of polygons within the same bounding volume may overlap, as is shown with polygons 1822 and 1823 in bounding volume 1816. However, polygons in non-overlapping bounding volumes, such as polygons 1822 and 1821 are automatically excluded from the need to check whether they are overlapping by the fact that bounding volumes 1812 and 1816 do not overlap.

Within the volume 1812 is a further volume sub-division 1833, that contains polygons 1826 and 1827. Clearly any polygons that are not contained in the bounding volume 1833 cannot intersect any polygons inside it. Thus, polygon 1821 cannot intersect either polygon 1826 or polygon 1827. Because there are no further sub-divisions of volume 1833, it then becomes appropriate to check for intersection between the polygons contained in its volume, in this case polygon 1826 and polygon 1827. In this case, the polygons are shown as intersecting, and it will be necessary to store this information such that appropriate surface sub-divisions can be made at step 1704.

Polygon 1824 is contained in bounding volume 1812, and polygon 1825 is contained in bounding volume 1813. Although both these bounding volumes 1812 and 1813 overlap, neither of them contains both polygons 1824 and 1825. Nevertheless, as shown in the illustration, it is possible that these polygons do intersect. The invention takes account of this possibility, and will identify the polygons 1824 and 1825 as intersecting.

Figure 19:
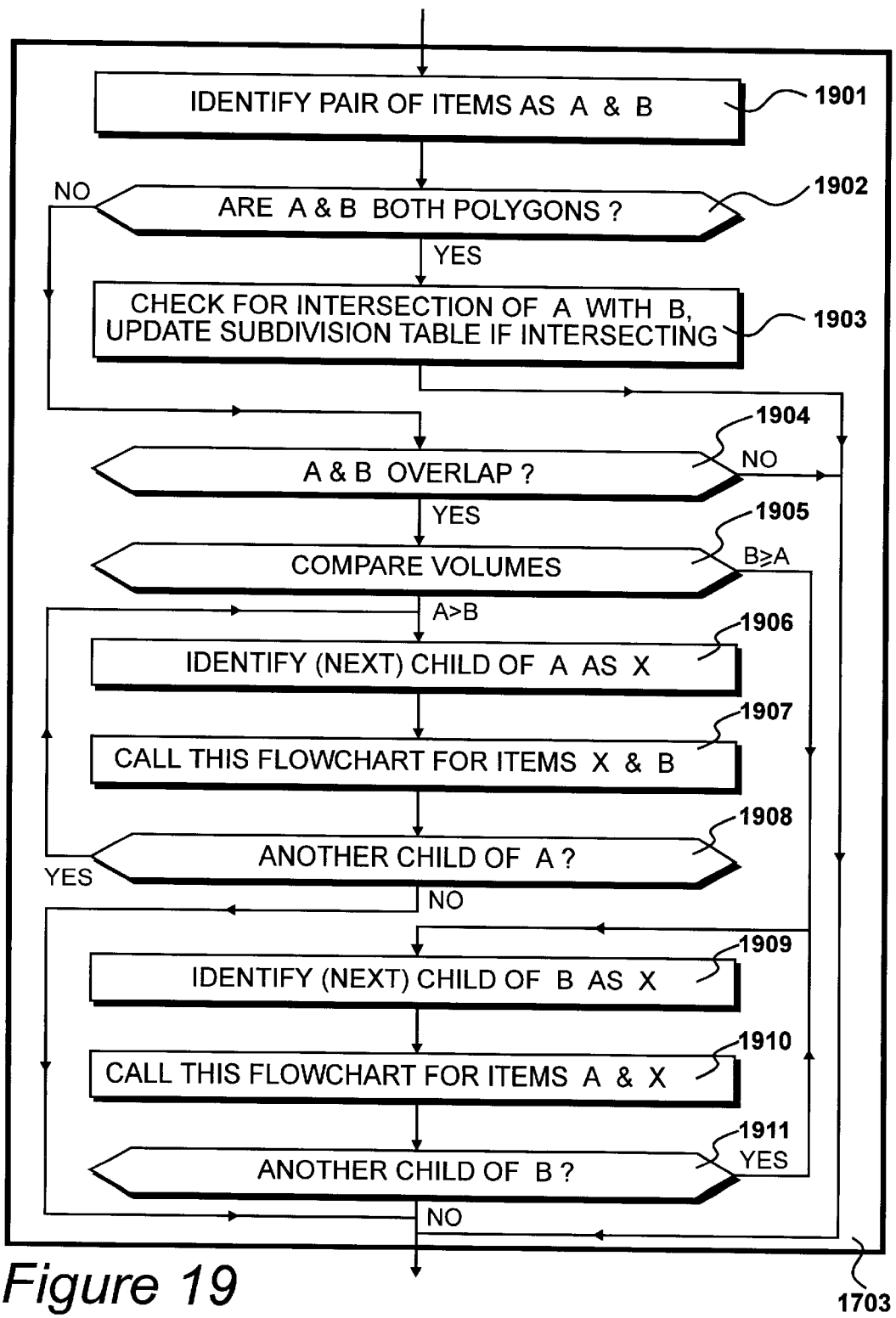
FIG. 19 details the step of recursively checking for intersecting polygons shown in FIG. 17.

A systematic algorithm for checking intersecting polygons in accordance with these rules is detailed in FIG. 19. At step 1901 the initial pair of items is identified as A and B. Thus, in the initial conditions, the whole scene volume will be considered as being A and also B. At step 1902 a question is asked as to whether A and B are both polygons. If answered in the negative, control is directed to step 1904. At step 1904 a question is asked as to whether A and B overlap. In the initial case where A and B are both the whole scene volume, the answer to this question is yes. Thereafter control is directed to step 1905. At step 1905 a comparison is made of the volumes of A and B. If A is greater than B, control is directed to step 1906. Alternatively, if B is greater or equal to A, control is directed to step 1909. This will be the case on the initial condition when A and B are both selected as being the whole scene volume. At step 1906 an identification is made of the next child of A. Thus, when the whole scene volume 1811 is being considered, a child of A could be any of bounding volumes 1812 to 1819.

At step 1907 the flow chart of FIG. 19 is called for items X and B. Thus, in the next instantiation of the process represented by this flowchart, X and B become identified at step 1901 as items A and B. At step 1908 a question is asked as to whether there is another child of A. If answered in the affirmative, control is directed back step 1906. Alternatively, if there are no child volumes of A, control is directed out of the flow chart shown in FIG. 19.

If the result of comparing volumes at step 1905 is that the volume of B is considered as being greater than or equal to A, control is directed to step 1909. At step 1909 an identification is made of the next child of B as being identified as X. Thus, any of volumes 1812 to 1819, may be identified as X at step 1909. At step 1910, the flow chart of FIG. 19 is called for items A and X, with A and X being identified as items A and B on each instantiation of the process represented by the flowchart. At step 1911 a question is asked as to whether there is another child of B available for consideration. If answered in the affirmative, control is directed to step 1909, where additional bounding volumes may be considered. Alternatively, if the question asked at step 1911 is answered in the negative, the processes for FIG. 19 are completed.

Completion of these processes may result in a return to a higher level of operation of the flowchart shown in FIG. 19. If the question asked at step 1902 is answered in the positive, and A and B are both polygons, control is directed to step 1903. At step 1903 a check is made for intersection of A with B. If A and B do intersect, a sub-division table is updated.

The amount of time taken to recursively check for intersecting polygons using the method detailed in FIG. 19, and which is indicated at step 1703 in FIG. 17, is proportional to the number of polygons in the scene. This may also be represented as being a problem having $O(n)$ complexity. Construction of the hierarchy of bounding volumes, illustrated in FIG. 18, and shown at step 1701 in FIG. 17 has a greater complexity of $O(n.\log(n))$. This is still less than the problem of identifying the possible intersection of every possible pair of polygons, which is a problem of $O(n^2)$ complexity. However, as previously stated, the hierarchy of bounding volumes may already have been created for other purposes.

Checking for the intersection of polygons requires that many floating point multiplications be performed. The invention avoids unnecessarily repeating such complex mathematical processes by considering the relationships between bounding volumes containing polygons, rather than the polygons themselves. The sides of the bounding volumes are aligned with the x, y and z axes of the global co-ordinate system. Thus, when considering whether or not bounding volumes overlap, only additions or subtractions are required.

Within the process disclosed in FIG. 19, a condition is eventually reached when both items A and B are polygons themselves, at which point it becomes necessary to perform the sequence of mathematical operations that is necessary to determine whether the polygons intersect. However, because this operation needs to be performed so rarely, in comparison to the square of the number of polygons within the scene, the time taken to determine which polygons in the scene are intersecting, is greatly reduced.

The information stored at step 1903, is eventually used when performing step 1704 shown in FIG. 17. In this way, polygons that intersect are divided along their lines of intersection prior to the steps of radiosity simulation, so that the mesh elements created from these polygons will have edges that align with the lines of intersection.

Figure 20:
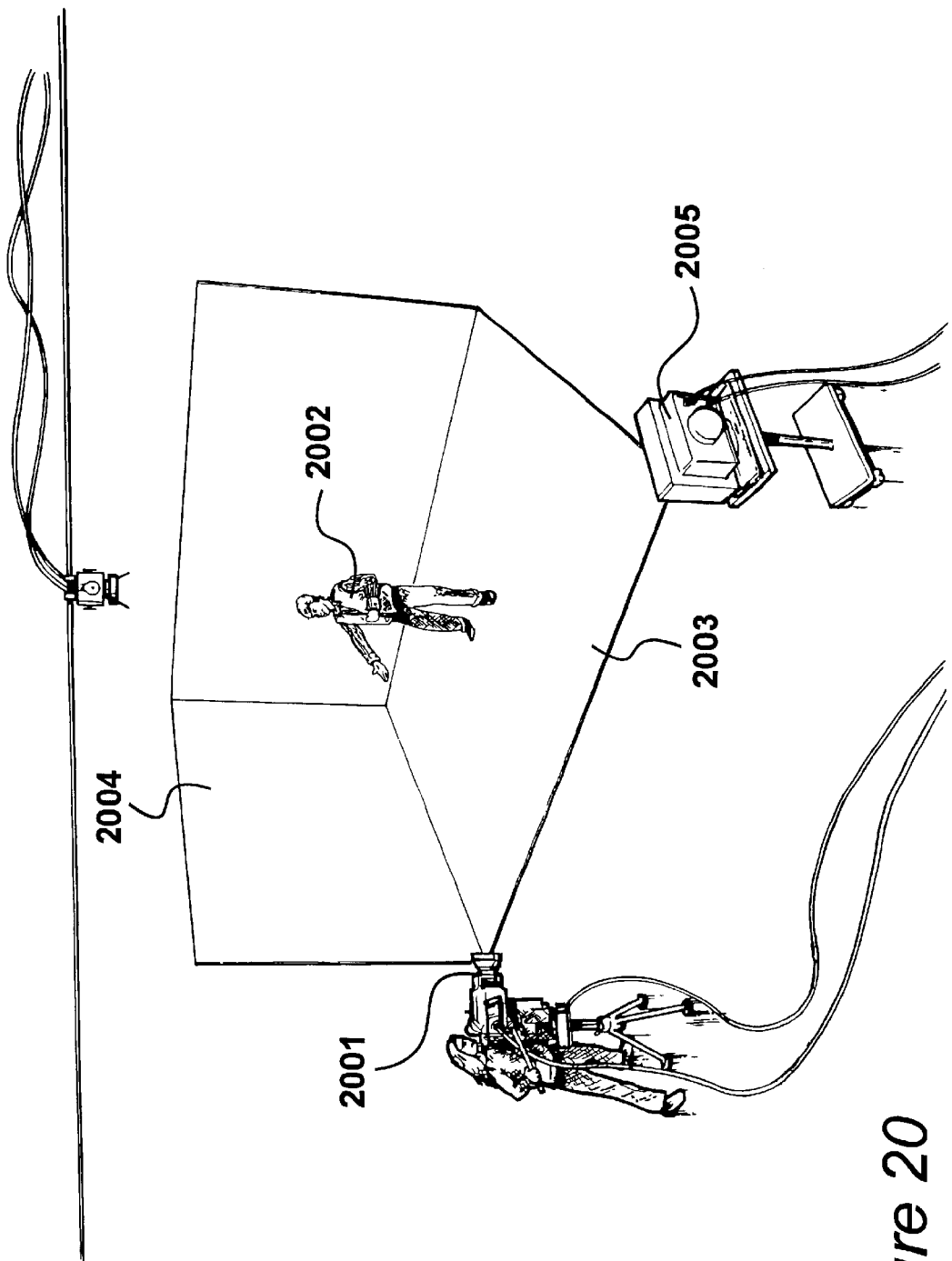
FIG. 20 shows a virtual set, for generating live video data.

The artificial scene shown in FIG. 4 may be combined with images from a real studio, such that artificial objects, walls and studio features may be superimposed upon a real studio in which minimal features are present. The combination of real and artificial images in this way results in the creation of a virtual set, in which real and virtual objects may be mixed. And example of a virtual set is shown in FIG. 20. A camera 2001 generates live video image data, as well as serial positioning data and lens data. The camera is aimed at talent 2002, located in the centre of a blue screen environment, comprising a blue screen floor 2003 and walls 2004. The blue colour of the walls is carefully controlled and calibrated in such a way as to facilitate automatic replacement of any blue areas of the subsequently processed camera images with a corresponding virtual image. A monitor 2005 facilitates visual feedback for the talent, such that it is possible to interact in a more natural way with objects in the virtual world.

Figure 21:
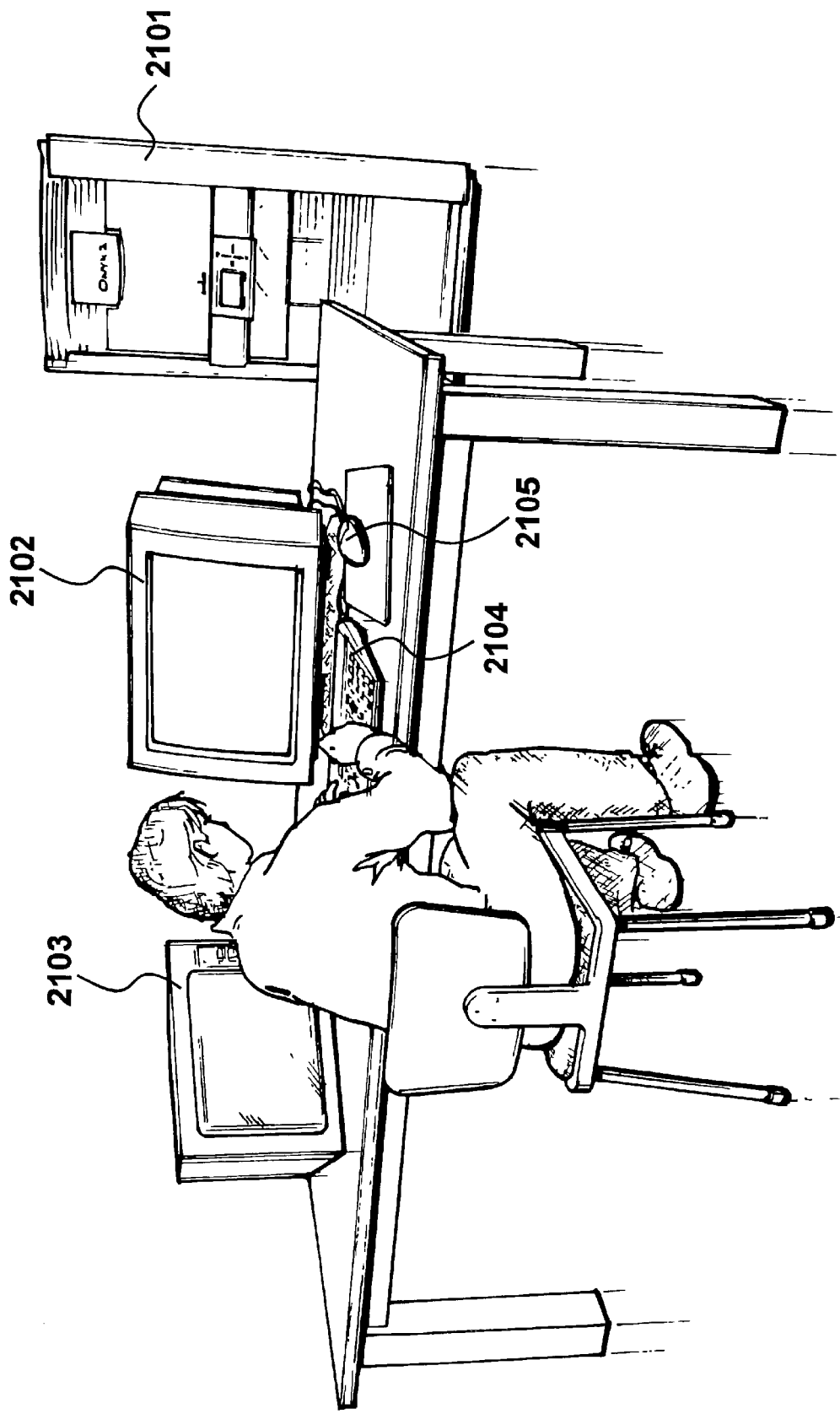
FIG. 21 details equipment combining camera data with scene data in real-time.

Equipment for compositing image data from the virtual set shown in FIG. 20 with artificial scene images such as the one shown in FIG. 4, is detailed in FIG. 21. A main processor 2101, such as an Onyx2™, manufactured by Silicon Graphics Inc, receives image and position data signals from the camera 2001 shown in FIG. 20. The position information from the camera, together with lens data, including zoom and focus, enable a calculation to be made of the viewpoint of the camera with respect to the virtual set. The walls of the virtual set are calibrated in position, so that at least one of either the floor or the two walls may be used as a reference plane that will match with a corresponding floor or wall plane in the artificial scene shown in FIG. 4. Commands for controlling the virtual environment are performed by the operator using a mouse 2105, a keyboard 2104 and a monitor 2102. A high quality broadcast monitor 2103 is also provided on which to view the results of the compositing process.

The operator has control over such parameters as blue screen removal, floor plane or wall plane tolerance mapping, quality control, ensuring that calibrations are maintained and so on. The main processor 2101 renders the scene shown in FIG. 4 in accordance with the radiosity simulation process described previously. Once this step has been performed, it then becomes possible to render the scene from any viewpoint. In a virtual set, the viewpoint is defined by the camera position and lens conditions. Thus, the main processor 2101 performs radiosity rendering in response to signals from the camera 2001. The rendered scene is then keyed with the real video data using a blue screen keyer process, such that the talent 2002 appears to be in a highly realistic scene, comprising the objects shown in FIG. 4. As is known, additional lighting effects may be added, in order to support view dependant lighting.

I claim:

1. A method of generating image data for a scene, wherein said scene includes object surfaces in three dimensions, comprising:
   identifying intersecting or touching surfaces by analysing said surfaces within a hierarchy of bounding volumes;
   constructing a multi-resolution representation of the radiosity equation for said scene, wherein one of said identified surfaces is considered for light emission on one side of a line of contact or intersection and then considered for light emission on the reverse side of said line of contact or intersection; and
   generating and displaying said scene, wherein the hierarchy of bounding volumes is created for a dual purpose of identifying the intersecting or touching surfaces and for generating the image data from said scene.

2. A method according to claim 1, wherein identifying intersecting or touching surfaces by analysis of bounding volumes comprises:
   considering bounding volumes and surfaces as items;
   identifying pairs of items;
   determining whether both items in the pair are surfaces;
   determining an overlap of items or an intersection of surfaces; and
   upon condition of an overlap, recursing the above component steps, retaining the smaller item and selecting another; or
   upon condition of an intersection, storing an indication of this condition.

3. A method according to claim 1, further comprising solving said radiosity equation.

4. A method according to claim 3, further comprising rendering said image data in response to a user-specified view.

5. A method according to claim 3, further comprising rendering said image data in response to virtual set data.

6. A method according to claim 1, wherein said identified surfaces are meshed such that mesh vertices are aligned upon a line of contact or intersection.

7. A method according to claim 1, wherein said image data is stored prior to image rendering.

8. A method of generating image data for a scene, wherein said scene includes object surface elements in three dimensions, the method comprising:
   identifying intersecting or touching surfaces by analysing said surfaces within a hierarchy of bounding volumes;
   splitting an identified surface along a line of contact or intersection so as to create two surface elements from the original one;
   constructing a multi-resolution representation of the radiosity equation for said scene using said split surfaces and original surfaces where these are not contacted or intersected along their surface; and
   generating and displaying said scene, wherein the hierarchy of bounding volumes is created for a dual purpose of identifying the intersecting or touching surfaces and for generating image data from said scene.

9. A method of generating image data for a scene from scene data, wherein said scene data includes representations of object surfaces in three dimensions, considered as elements, the method comprising:
   identifying intersecting or touching surfaces by analysing said surfaces within a hierarchy of bounding volumes;
   splitting an identified surface along a line of contact or intersection so as to create two elements from the original one;
   constructing a multi-resolution representation of the radiosity equation for said scene by calculating simulated light reflections between said elements; and
   generating and displaying said scene, wherein the hierarchy of bounding volumes is created for a dual purpose of identifying the intersecting or touching surfaces and for generating image data from said scene.

10. Apparatus for generating image data from scene data, comprising processing means, and storage means for storing said scene data and for storing instructions for said processing means, wherein said scene includes object surfaces in three dimensions, and said instructions are arranged to control said processing means to perform a method comprising:
   identifying intersecting or touching surfaces by analysing said surfaces within a hierarchy of bounding volumes;
   constructing a multi-resolution representation of the radiosity equation for said scene, wherein one of said identified surfaces is considered for light emission on one side of a line of contact or intersection and then considered for light emission on the reverse side of said line of contact or intersection; and
   generating and displaying said scene, wherein the hierarchy of bounding volumes is created for a dual purpose of identifying the intersecting or touching surfaces and for generating image data from said scene.

11. Apparatus according to claim 10, further configurable such that identifying intersecting or touching surfaces by analysis of bounding volumes comprises:
    considering bounding volumes and surfaces as items;
    identifying pairs of items;
    determining whether both items in said pair are surfaces;
    determining an overlap of items or an intersection of surfaces; and
    upon condition of an overlap, recursing the above component steps, retaining the smaller item and selecting another; or
    upon condition of an intersection, storing an indication of this condition.

12. Apparatus according to claim 10, further configured to solve said radiosity equation.

13. Apparatus according to claim 12, further configurable to perform a step-by-step rendering of said image data in response to a user-specified view.

14. Apparatus according to claim 12, further configured to render said image data in response to camera data generated in a virtual set.

15. Apparatus according to claim 10, wherein said identified surfaces may be meshed such that mesh vertices are aligned upon the line of contact or intersection.

16. Apparatus according to claim 10, including further storage means arranged for storing said image data prior to image rendering.

17. Apparatus for generating image data from scene data, including processing means, and storage means for storing said scene data and instructions for said processing means, wherein said scene includes object surfaces in three dimensions; said instructions arranged to control said processing means to perform a method comprising:
    identifying intersecting or touching surfaces by analysing said surfaces within a hierarchy of bounding volumes;
    splitting an identified surface along a line of contact or intersection so as to create two surface elements from the original one;
    constructing a multi-resolution representation of the radiosity equation for said scene using said split surfaces and original surfaces where these are not contacted or intersected along their surface; and
    generating and displaying said scene, wherein the hierarchy of bounding volumes is created for a dual purpose of identifying the intersecting or touching surfaces and for generating image data from said scene.

18. Apparatus for generating image data from scene data, including processing means, and storage means for storing said scene data and instructions for said processing means, wherein said scene includes object surfaces in three dimensions; said instructions arranged to control said processing means to perform a method comprising:
    identifying intersecting or touching surfaces by analysing said surfaces within a hierarchy of bounding volumes;
    splitting an identified surface along a line of contact or intersection so as to create two elements from the original one;
    constructing a multi-resolution representation of the radiosity equation for said scene by calculating simulated light reflections between said elements; and
    generating and displaying said scene, wherein the hierarchy of bounding volumes is created for a dual purpose of identifying the intersecting or touching surfaces and for generating image data from said scene.

19. In a virtual set, in which teal foreground images are combined with synthesised background images in real-time, apparatus configured to generate said background image data, comprising
    means for generating image data from scene data, including processing means, and storage means for storing said scene data and for storing instructions for said processing means, wherein said scene includes object surfaces in three-dimensions and said instructions are arranged to control said processing means to perform a method comprising:
    identifying intersecting or touching surfaces by analysing said surfaces within a hierarchy of bounding volumes;
    constructing a multi-resolution representation of the radiosity equation for said scene, wherein one of said identified surfaces is considered for light emission on one side of a line of contact or intersection and then considered for light emission on the reverse side of said line of contact or intersection; and
    generating and displaying said scene, wherein the hierarchy of bounding volumes is created for a dual purpose of identifying the intersecting or touching surfaces and for generating image data from said scene.

20. Apparatus according to claim 19, wherein identifying intersecting or touching surfaces by analysis of bounding volumes comprises:
    considering bounding volumes and surfaces as items;
    identifying pairs of items;
    determining whether both items in said pair are surfaces;
    determining an overlap of items or an intersection of surfaces; and
    upon condition of an overlap, recursing the above component steps, retaining the smaller item and selecting another; or
    upon condition of an intersection, storing an indication of this condition.

21. Apparatus according to claim 19, further configured to solve said radiosity equation.

22. Apparatus according to claim 21, further configurable to perform a step-by-step rendering of image data in response to user specified view.

23. Apparatus according to claim 21, further configured to render said image data in response to camera data generated in said virtual set.

24. Apparatus according to claim 19, wherein said identified surfaces may be meshed such that meshed vertices are aligned upon the light of contact or intersection.

25. Apparatus according to claim 19, including further storage means arranged for storing said image data prior to image tendering.

26. Apparatus according to claim 19, including display means for displaying a combination of teal and synthesised images to talent working within the virtual set.

27. Apparatus according to claim 23, wherein said camera data includes camera positional data and camera lens related data.

28. A computer-readable medium having computer-readable instructions executable by a computer such that said computer performs steps for generating image data for a scene, wherein said scene includes object surfaces in three-dimensions; comprising the steps of
    identifying intersecting or touching surfaces by analysing said surfaces within a hierarchy of bounding volumes;
    constructing a multi-resolution representation of the radiosity equation for said scene, wherein one of said identified surfaces is considered for light emission on one side of a line of contact or intersection and then considered for light emission on the reverse side of said line of contact or intersection; and generating and displaying said scene, wherein the hierarchy of bounding volumes is created for a dual purpose of identifying the intersecting or touching surfaces and for generating image data from said scene.

29. A computer-readable medium according to claim 28, wherein said instructions are executed by said computer, such that said step of identifying intersecting or touching surfaces by analysis of bounding volumes includes the component steps of:

considering bounding volumes and surfaces as items;

identifying pairs of items;

determining whether both items in a pair are surfaces;

determining an overlap of items or an intersection of surfaces; and upon condition of an overlap, tecursing the above component steps, retaining the smaller item and selecting another; or upon condition of an intersection, storing an indication of this condition.

30. A computer-readable medium according to claim 28, wherein said instructions are executed by said computer such that the further step of solving said radiosity equation is included.

31. A computer-readable medium according to claim 30, wherein said instructions are executed by said computer such that the further step of rendering said image in response to a user specified view is included.

32. A computer-readable medium according to claim 30, wherein said instructions are executed by said computer, such that a step of rendering said image data in response to virtual set data is included.

33. A computer-readable medium according to claim 28, wherein said instructions are executed by said computer such that said identified surfaces ate meshed, wherein mesh vertices are aligned upon a line of contact or intersection.

34. A computer-readable medium according to claim 28, wherein said instructions are executed by said computer, such that said image data is stored prior to image rendering.

* * * * *

UNITED STATES PATENT AND TRADEMARK OFFICE
CERTIFICATE OF CORRECTION

PATENT NO.    : 6,366,283 B1                                    Page 1 of 1
DATED         : April 2, 2002
INVENTOR(S)   : Filippo Tampieri It is certified that error appears in the above-identified patent and that said Letters Patent is hereby corrected as shown below:

<u>Title page, Item [54] and Column 1, line 1,</u>
Title, "GENERATING IMAGE DATA" should read -- RADIOSITY WITH INTERSECTING OR TOUCHING SURFACES --.

Signed and Sealed this

Twenty-fourth Day of June, 2003

JAMES E. ROGAN
*Director of the United States Patent and Trademark Office*